US011526956B2

(12) United States Patent
Cahalane et al.

(10) Patent No.: US 11,526,956 B2
(45) Date of Patent: Dec. 13, 2022

(54) SKILL ACQUISITION PLATFORM

(71) Applicant: Accenture Global Solutions Limited, Dublin (IE)

(72) Inventors: Diarmuid John Cahalane, County Cork (IE); Patrick Moreau, Dublin (IE); David Byrne, County Wicklow (IE); Eoin Ó Loideáin, Dublin (IE)

(73) Assignee: Accenture Global Solutions Limited, Dublin (IE)

(*) Notice: Subject to any disclaimer, the term of this patent is extended or adjusted under 35 U.S.C. 154(b) by 210 days.

(21) Appl. No.: 16/791,475

(22) Filed: Feb. 14, 2020

(65) Prior Publication Data

US 2021/0256644 A1 Aug. 19, 2021

(51) Int. Cl.
| | |
|---|---|
| *G06Q 10/10* | (2012.01) |
| *G06Q 10/06* | (2012.01) |
| *G06Q 30/08* | (2012.01) |
| *G06Q 50/20* | (2012.01) |
| *G06N 20/00* | (2019.01) |
| *G06N 5/02* | (2006.01) |
| *G06F 16/28* | (2019.01) |

(52) U.S. Cl.
CPC ....... *G06Q 50/2057* (2013.01); *G06F 16/285* (2019.01); *G06N 5/02* (2013.01); *G06N 20/00* (2019.01); *G06Q 10/10* (2013.01); *G06Q 10/1053* (2013.01)

(58) Field of Classification Search
CPC ............... G06Q 50/2057; G06Q 10/10; G06Q 10/1053; G06F 16/285; G06N 5/02; G06N 20/00

USPC .................................. 705/320, 321, 1.1–912
See application file for complete search history.

(56) References Cited

U.S. PATENT DOCUMENTS

| | | | | |
|---|---|---|---|---|
| 8,082,168 | B1* | 12/2011 | Judy ...................... | G06Q 10/10 705/7.14 |
| 8,650,177 | B2* | 2/2014 | Skomoroch ............ | G06Q 50/01 707/710 |
| 11,158,016 | B2* | 10/2021 | Varga .................... | G06Q 50/205 |
| 2013/0251269 | A1* | 9/2013 | Chehaiber ............. | G06F 16/583 382/197 |
| 2015/0127567 | A1* | 5/2015 | Menon ............... | G06Q 10/1053 705/321 |
| 2015/0170303 | A1* | 6/2015 | Geritz .................... | G06Q 10/00 705/326 |
| 2016/0260064 | A1* | 9/2016 | Ahmed ................. | H04L 67/306 |
| 2016/0379170 | A1* | 12/2016 | Pande ................... | G06F 16/285 705/321 |
| 2017/0213179 | A1* | 7/2017 | Schissel ......... | G06Q 10/063112 |

(Continued)

*Primary Examiner* — Jonathan P Ouellette
(74) *Attorney, Agent, or Firm* — Harrity & Harrity, LLP

(57) ABSTRACT

A skill acquisition platform may receive input identifying a target role for a user, may identify users from the plurality of users that have worked in the target role, may identify, based on a similarity metric, a subset of the users that have worked in the target role and have similar career trajectories to the user, may cluster vectors of the user and vectors of the subset of the users that have worked in the target role to generate a plurality of skill groups, may generate a directed network graph that represents links between the plurality of skill groups, may identify one or more paths between a first skill group associated with the user and a second skill group associated with the target role, and may automatically generate a descriptive analysis of the one or more paths.

19 Claims, 15 Drawing Sheets

(56) References Cited

U.S. PATENT DOCUMENTS

| | | | |
|---|---|---|---|
| 2017/0228696 A1* | 8/2017 | Brdiczka | G06Q 10/1053 |
| 2017/0236095 A1* | 8/2017 | Schreiber | G06F 3/0482 |
| | | | 705/321 |
| 2018/0232702 A1* | 8/2018 | Dialani | G06Q 50/01 |
| 2018/0239830 A1* | 8/2018 | Dialani | G06Q 10/1053 |
| 2019/0122161 A1* | 4/2019 | Cicio, Jr. | G06F 16/22 |
| 2019/0130281 A1* | 5/2019 | Yang | G06N 3/0427 |
| 2019/0228288 A1* | 7/2019 | Siddiqui | G06Q 10/105 |
| 2019/0340945 A1* | 11/2019 | Malhotra | G06N 3/084 |
| 2020/0294166 A1* | 9/2020 | Vos | G06N 20/00 |
| 2020/0302296 A1* | 9/2020 | Miller | G06N 3/0427 |

\* cited by examiner

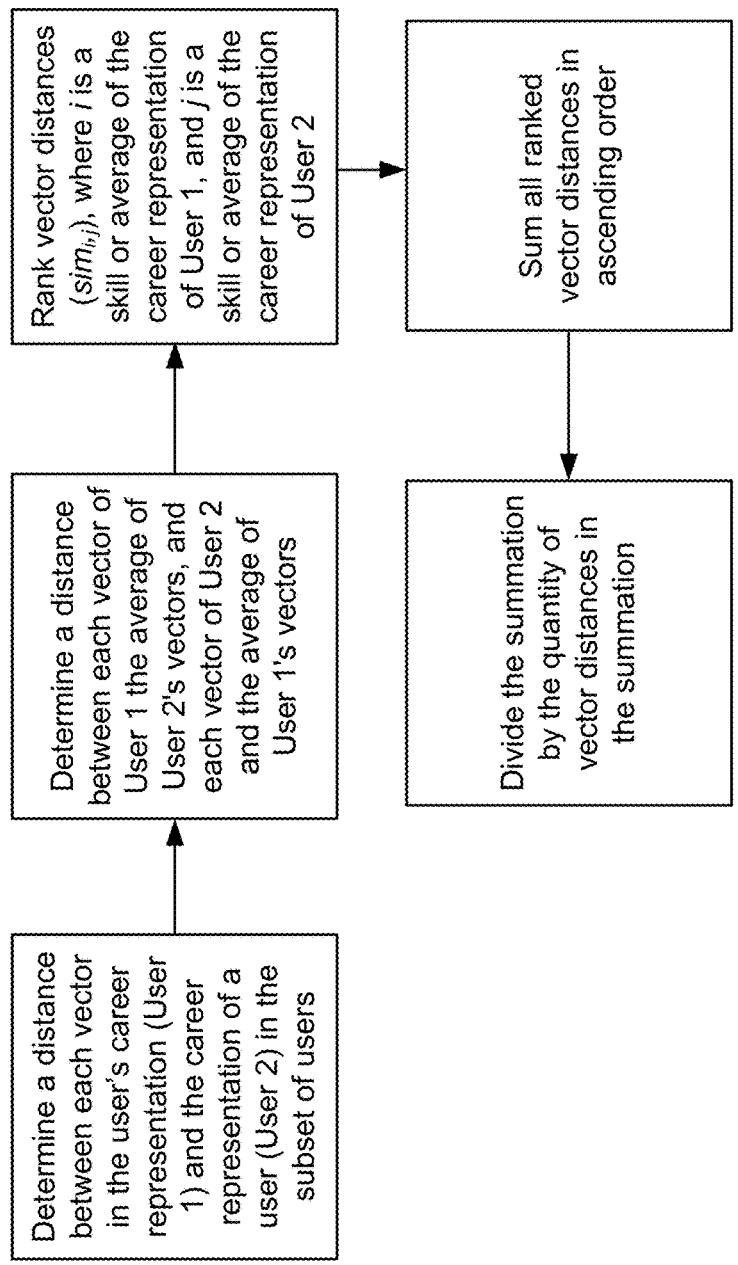

Example Similarity Metric Algorithm 2

- Determine a distance between each vector in the user's career representation (User 1) and the career representation of a user (User 2) in the subset of users
- Determine a distance between each vector of User 1 the average of User 2's vectors, and each vector of User 2 and the average of User 1's vectors
- Rank vector distances ($sim_{n;j}$), where $i$ is a skill or average of the career representation of User 1, and $j$ is a skill or average of the career representation of User 2
- Sum all ranked vector distances in ascending order
- Divide the summation by the quantity of vector distances in the summation

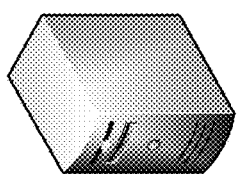

Skill Acquisition Platform

FIG. 1D

SKILL ACQUISITION PLATFORM

BACKGROUND

In today's highly technical labor market, there is ever growing demand for more and more skilled workers. As some industries, such as Internet of Things, artificial intelligence, Industry X.0, and/or the like, accelerate in growth, employers, hiring managers, and other personnel are often given a difficult task of identifying new talent for these critical demand areas. One approach is to identify the most promising candidates for re-skilling to fill roles in these critical demand areas, as well as other highly technical and fast-growing areas.

SUMMARY

According to some implementations, a method may include obtaining, by a device, a set of knowledge graph embeddings, the knowledge graph embeddings representing current skillset data, the current skillset data including a career parameter; receiving, by the device, input identifying a target skillset for a user; determining, by the device, a career vector set based on vector triples in the embedding space; determining, by the device, the number of vectors in each career parameter; determining, by the device, a similarity score between each vector in a first career parameter and each vector in a second career parameter; clustering, by the device, the vectors based on the similarity scores to generate a plurality of skill groups; generating, by the device, a directed network graph based on the cluster, the directed network graph representing links between the plurality of skill groups; determining, by the device, a weighting score for each edge in the directed network graph based on a sequence of the vectors and based on the clusters; and identifying, by the device, one or more optimum paths between a current skillset associated with the user and the target skillset based on the weighted scores.

According to some implementations, a skill acquisition platform may include one or more memories; and one or more processors, communicatively coupled to the one or more memories, configured to: obtain a set of knowledge graph embeddings, the knowledge graph embeddings representing current skillset data, the current skillset data including a career parameter; identify a target skillset for a user; determine a career vector set based on vector triples in the embedding space; determine the number of vectors in each career parameter; determine a similarity score between each vector in a first career parameter and each vector in a second career parameter; cluster the vectors based on the similarity scores to generate a plurality of skill groups; generate a directed network graph based on the cluster, the directed network graph representing links between the plurality of skill groups; determine a weighting score for each edge in the directed network graph based on a sequence of the vectors and based on the clusters; and identify one or more optimum paths between a current skillset associated with the user and a target skillset based on the weighted scores.

According to some implementations, a non-transitory computer-readable medium may store one or more instructions. The one or more instructions, when executed by one or more processors of a skill acquisition platform, may cause the one or more processors to: obtain a set of knowledge graph embeddings, the knowledge graph embeddings representing current skillset data, the current skillset data including a career parameter; determine a career vector set based on vector triples in the embedding space; determine the number of vectors in each career parameter; determine a similarity score between each vector in a first career parameter and each vector in a second career parameter; cluster the vectors based on the similarity scores to generate a plurality of skill groups; generate a directed network graph based on the cluster, the directed network graph representing links between the plurality of skill groups; determine a weighting score for each edge in the directed network graph based on a sequence of the vectors and based on the clusters; identify one or more optimum paths between a current skillset associated with the user and a target skillset based on the weighted scores; and automatically generate a descriptive analysis of the one or more optimal paths that identifies at least one of: a graphical representation of the one or more optimal paths, an estimated path length for each of the one or more optimal paths, one or more links of statistical interest included in the one or more optimal paths, an estimated difficulty of each of the one or more optimal paths, or a frequency of occurrence of each of the one or more optimal paths.

According to some implementations, a method may include receiving, by a device, input identifying a target role for a user; identifying, by the device and based on a respective career representation for each of a plurality of users, users from the plurality of users that have worked in the target role; identifying, by the device and based on a similarity metric, a subset of the users that have worked in the target role and have similar career trajectories to the user; clustering, by the device, vectors of the user and vectors of the subset of the users that have worked in the target role to generate a plurality of skill groups, wherein the vectors of the user represent one or more career attributes of the user; generating, by the device, a directed network graph that represents links between the plurality of skill groups; identifying, by the device, one or more paths between a first skill group, of the plurality of skills groups, associated with the user and a second skill group, of the plurality of skill groups, associated with the target role; and automatically generating, by the device, a descriptive analysis of the one or more paths.

According to some implementations, a skill acquisition platform may include one or more memories, and one or more processors, communicatively coupled to the one or more memories, configured to: identify a target role for a user; identify, based on a respective career representation for each of a plurality of users, users from the plurality of users that have worked in the target role; generate similarity metrics for the users that have worked in the target role, based on vectors of the user and vectors of the users that have worked in the target role; identify a subset of the users that have worked in the target role and have similar career trajectories to the user, wherein the subset of the users are associated with similarity metrics that satisfy a similarity metric threshold; cluster the vectors of the user and vectors of the subset of the users that have worked in the target role, to generate a plurality of skill groups; generate a directed network graph that represents links between the plurality of skill groups; identify one or more paths between a first skill group, of the plurality of skills groups, associated with the user and a second skill group, of the plurality of skill groups, associated with the target role; and at least one of: automatically enroll the user in a class to obtain a skill included in one or more paths, automatically identify one or more job postings associated with a role included in the one or more paths, automatically transmit, to a user device associated with the user, an instruction to display the class or the one or more job postings, or automatically transmit, to the user device, an instruction to display a visual representation of the one or more paths.

According to some implementations, a non-transitory computer-readable medium may store one or more instructions. The one or more instructions, when executed by one or more processors of a device, may cause the one or more processors to: identify a target role for a user; identify, based on a respective career representation for each of a plurality of users, users from the plurality of users that have worked in the target role; identify, based on a similarity metric, a subset of the users that have worked in the target role and have similar career trajectories to the user; cluster vectors of the user and vectors of the subset of the users that have worked in the target role to generate a plurality of skill groups; generate a directed network graph that represents links between the plurality of skill groups; identify one or more paths between a first skill group, of the plurality of skills groups, associated with the user and a second skill group, of the plurality of skill groups, associated with the target role; and automatically generate a descriptive analysis of the one or more paths that identifies at least one of: a graphical representation of the one or more paths, an estimated path length for each of the one or more paths, one or more links of statistical interest included in the one or more paths, an estimated difficulty of each of the one or more paths, or a frequency of occurrence of each of the one or more paths.

BRIEF DESCRIPTION OF THE DRAWINGS

FIGS. 1A-1G are diagrams of one or more example implementations described herein.

DETAILED DESCRIPTION

Figure 1A:
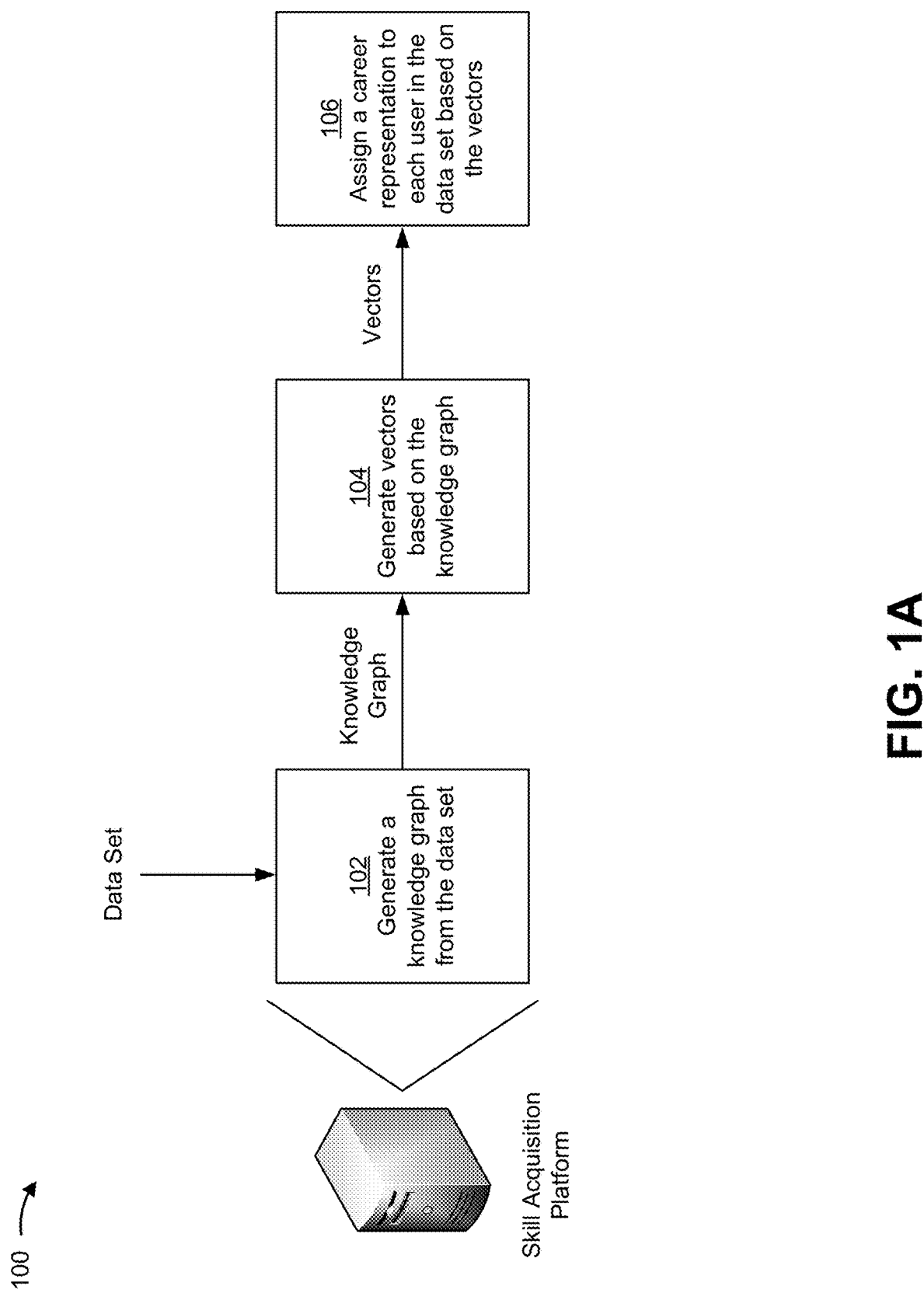

The following detailed description of example implementations refers to the accompanying drawings. The same reference numbers in different drawings may identify the same or similar elements.

It is a challenge to guide potential workers with adjacent skillsets in obtaining the additional skills required to productively take up work in roles in highly technical and fast-growing industries. Even if the skills, experiences, certifications, and/or education necessary to obtain a target role are identified, the best order or path in which a worker should obtain these skills, experiences, certifications, and/or education to best prepare to work in the target role may be unclear. The worker may spend countless hours researching the target role through manual Internet searching, which may result in inefficient consumption of computing resources, networking resources, power, and time, while still not being able to fully understand the best or most efficient career paths to take in order to obtain the target role.

Some implementations described herein provide a skill acquisition platform that is capable of identifying the best, shortest, or most comprehensive paths for a user to obtain a target role based on the user's current career placement, skills, education, and/or the like and other users' career trajectories that have transitioned into the target role. The skill acquisition platform is capable of building a knowledge graph from a data set that includes resume data, career data, and/or other types of data associated with a plurality of users. The skill acquisition platform is capable of using a machine learning model for relational learning on the knowledge graph to generate vectors for the plurality of users. The vectors may be embedding vectors that numerically represent the skills, experiences, industries, certifications, education, and/or the like of the other users. The embedding vectors permit the skill acquisition platform to determine numerical similarities and conduct fuzzy matching between the user and the plurality of users. The skill acquisition platform is capable of generating career representations for the plurality of users. A career representation for a user may be a "bag of skills" for the user, which may include the vectors that were generated for the user.

The skill acquisition platform is capable of generating similarity metrics for each of the plurality of users using one or more similarity metric algorithms, and identifying a subset of the plurality of users that have similar career trajectories to the user based on the similarity metric. A similarity metric may be a numerical representation of how similar the career trajectory of the user is to another user and may be based on the career representation of the user and the career representations of the plurality of users. The skill acquisition platform is capable of using machine learning clustering algorithms to cluster vectors of the user and vectors of the subset of the users into skill groups. The skill acquisition platform is capable of using shortest path algorithms and/or breadth-first algorithms to identify the shortest paths, most comprehensive paths, and/or other optimal paths between skill groups that the user may take in order to obtain the skills, industry experiences, certifications, education, and/or the like that will position the user to obtain the target role with high likelihood.

In this way, the skill acquisition platform may automatically analyze data sets to generate knowledge graphs, may use a neural machine learning model for relational learning on the knowledge graphs to generate embedding vectors, may use machine learning clustering algorithms, shortest path algorithms, breadth-first algorithms, and/or other algorithms to identify similar users that have obtained the target role of the user, and to identify one or more paths, based on the similar users, that the user may take in order to obtain the skills, industry experiences, certifications, education, and/or the like that will position the user to obtain the target role with high likelihood. In this way, the skill acquisition platform may generate a descriptive analysis of the one or more paths, which may provide a detailed visualization of the one or more paths, may provide actionable recommendations for training, education, and industry experience, may provide a difficulty and/or a feasibility analysis of the one or more paths in a manner that conserves computing resources, networking resources, and/or the like that would otherwise be wasted by the user trying to subjectively, aimlessly, and/or arbitrarily perform Internet searching for career development, skill acquisition, and/or the like. Moreover, in this way, the skill acquisition platform may automatically perform one or more actions based on the one or more paths (such as automatically enroll the user in training and/or certification courses), may automatically identify job postings to obtain recommended industry experience, and/or may perform other automatic actions.

FIGS. 1A-1G are diagrams of one or more example implementations 100 described herein. As shown in FIGS. 1A-1G, example implementation(s) 100 may include a skill acquisition platform. In some implementations, example implementation(s) 100 may include a user device, a data store, and/or other devices.

The skill acquisition platform includes a platform that may automatically analyze data sets to generate knowledge graphs, may use neural machine learning models for relational learning on the knowledge graphs to generate embedding vectors, may use machine learning clustering algorithms, shortest path algorithms, breadth-first algorithms, and/or other algorithms to identify similar users that have obtained the target role of the user, and to identify one or more paths, based on the similar users, that the user may take in order to obtain the skills, industry experiences, certifications, education, and/or the like that will position the user to obtain the target role with high likelihood.

As shown in FIG. 1A, the skill acquisition platform may generate career representations for a plurality of users based on resume data, career data, and/or the like. The skill acquisition platform may use the career representations to identify career and/or skill development paths that other users may take in order to obtain a target role or target skill held by one or more of the users. As shown by reference number 102, the skill acquisition platform may receive a data set that includes the resume data, career data, and/or the like associated with a plurality of users, and may train or generate a knowledge graph on the data set.

In some implementations, the resume data, career data, and/or the like may be received or obtained from a data store (e.g., implemented by a database, a storage device, a memory device, a storage server, a cloud platform, and/or the like) that stores resume data, career data, career representations, and/or other data and information. In some implementations, resume data, career data, and/or the like may be received and stored in the data store in one or more electronic files, which may include structured and/or unstructured electronic files. The structured and/or unstructured electronic files may be stored in the data store by a user device, a server device, the skill acquisition platform, and/or other sources. In some implementations, the data store, the skill acquisition platform, and/or another device may perform optical character recognition and/or other file structuring techniques to structure the resume data, the career data, and/or the like included in the unstructured electronic files.

In some implementations, the resume data, career data, and/or the like associated with a user may include information about the user such as the identity of the user, the current role or employment of the user, previous roles and/or employment of the user, industries that the user has worked in or previously worked in, dates of employment, skills (e.g., career skills, technical skills, and/or the like), certifications (e.g., technical certifications, industry certifications, and/or the like), education obtained by the user, projects that the user has worked on, and/or the like.

In some implementations, the skill acquisition platform may generate, train, update, and/or otherwise maintain the knowledge graph based on new or updated resume data, the career data, and/or the like being added to the data store, based on receiving an instruction to generate, train, update, and/or otherwise maintain the knowledge graph, and/or the like. The skill acquisition platform may generate the knowledge graph by generating links or associations between user identities, employers, roles, skills, certifications, education, and/or other entities and attributes identified in the data set. In this way, the knowledge graph represents relationships between the user identities, employers, roles, skills, certifications, education, and/or other entities and attributes of the plurality of users.

As further shown in FIG. 1A, and by reference number 104, the skill acquisition platform may generate vectors from the data set based on the knowledge graph. A vector may be an embedded vector or a network embedding that represents a discrete variable to a vector of continuous numbers. Each vector may represent a particular type of skill, a particular type of role or experience, a particular type of industry, a particular type of certification, a particular type of education, a particular employer, and/or the like.

The skill acquisition platform may generate the vectors by using a network (e.g., an artificial network) to learn the vectors from the knowledge graph.

As further shown in FIG. 1A, and by reference number 106, the skill acquisition platform may generate and assign a career representation to each of the plurality of users associated with the data set, based on the learned vectors. A career representation for a user may be a "bag of skills" for the user, which may include the vectors (e.g., the employers, roles, skills, certifications, education, and/or other entities and attributes) that are associated with the user. Moreover, the career representation may represent a career trajectory of the user based on the vectors, and the career trajectory may include the specific sequence or timeline in which each vector associated with the user was added to the user's "bag of skills." In this case, the career representation may represent transitions between employment and/or industries, the order in which the user obtained certifications and/or education, and/or the like.

In some implementations, the skill acquisition platform may store the career representations of the plurality of users in the data store. In this way, the skill acquisition platform may obtain or receive the career representations to identify users similar to another user who is interested in obtaining a target role, a target skill, or another type of target career aspect.

Figure 1B:
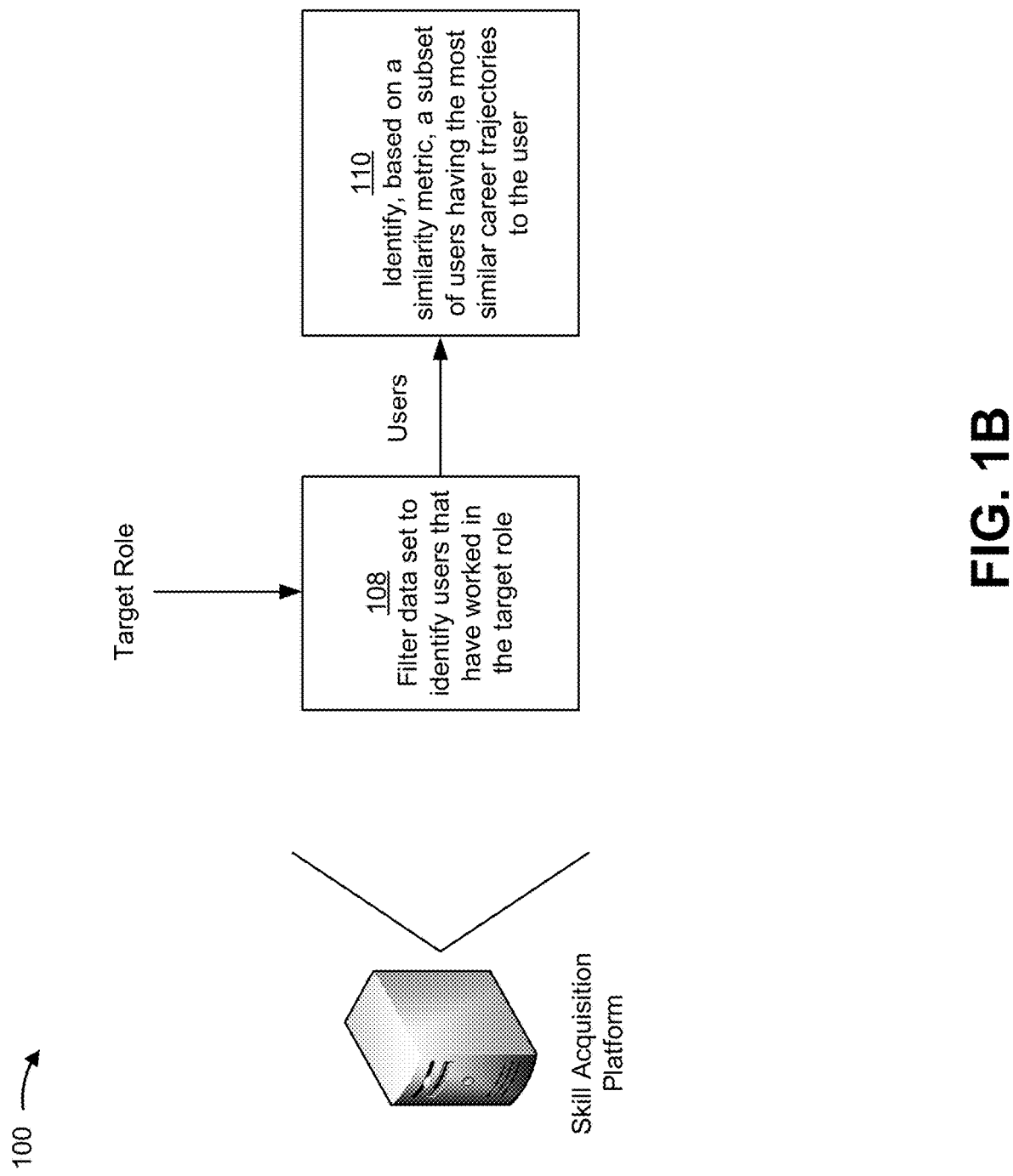

As shown in FIG. 1B, and by reference number 108, the skill acquisition platform may identify a target role associated with a user, may receive input (e.g., from a user device, a server device, an input device, and/or another source) identifying the target role, and/or the like, and may filter the data set to identify users that have worked in the target role. The target role may be a role to which the user intends to transition, may be a role for which an entity (e.g., a potential employer, a business, and/or the like) intends to potentially hire the user, and/or the like.

In some implementations, the skill acquisition platform may filter the data set to identify users that have worked in the target role by identifying users associated with career representations that include the target role as a vector. The skill acquisition platform may search the career representations in the data store to identify the career representations that include the target role as a vector, and may identify the users associated with the identified career representations.

In some implementations, the skill acquisition platform may filter the data set based on additional criteria, such as users that are currently working in the target role, users that have worked in the target role for a threshold time duration (e.g., 5 years, 10 years, and/or the like), users that have recently transitioned to the target role (e.g., within the past year, within the past six months, and/or the like), and/or the like.

As further shown in FIG. 1B, and by reference number 110, the skill acquisition platform may identify, based on a similarity metric, a subset of users having the most similar career trajectories to the user's career trajectory. The skill acquisition platform may identify the subset of users based on the career representation of the user (e.g., the vectors included in the career representation of the user) and the career representation of the subset of users (e.g., the vectors included in the career representations of the subset of users). If the user does not have a career representation stored in the data store, the skill acquisition platform may generate a career representation for the user. In some implementations, the subset of users may be other users that have a same or similar career trajectory or career progression up to the current point in the career of the user. In this way, the skill acquisition platform identifies other users that transitioned to the target role from the same or similar career background as the user.

In some implementations, the skill acquisition platform may generate a similarity metric (or similarity score) for each of the plurality of users. A similarity metric may be a numerical representation of how similar the career trajectory of the user is to another user in the plurality of users. The skill acquisition platform may generate similarity metrics for the plurality of users based on various similarity metric algorithms.

Some example similarity metric algorithms are illustrated and described in connection with FIGS. 1C-IE. However, the skill acquisition platform may use other similarity metric algorithms to identify subset of users having the most similar career trajectories to the user's career trajectory. In some implementations, a similarity metric algorithm may focus on similarity between users as opposed to dissimilarity. In some implementations, a similarity metric algorithm may focus on all elements of a user's career or a subset thereof. In some implementations, a similarity metric algorithm may handle mismatches in length between career representations, career trajectories, or career progressions of users.

Figure 1C:
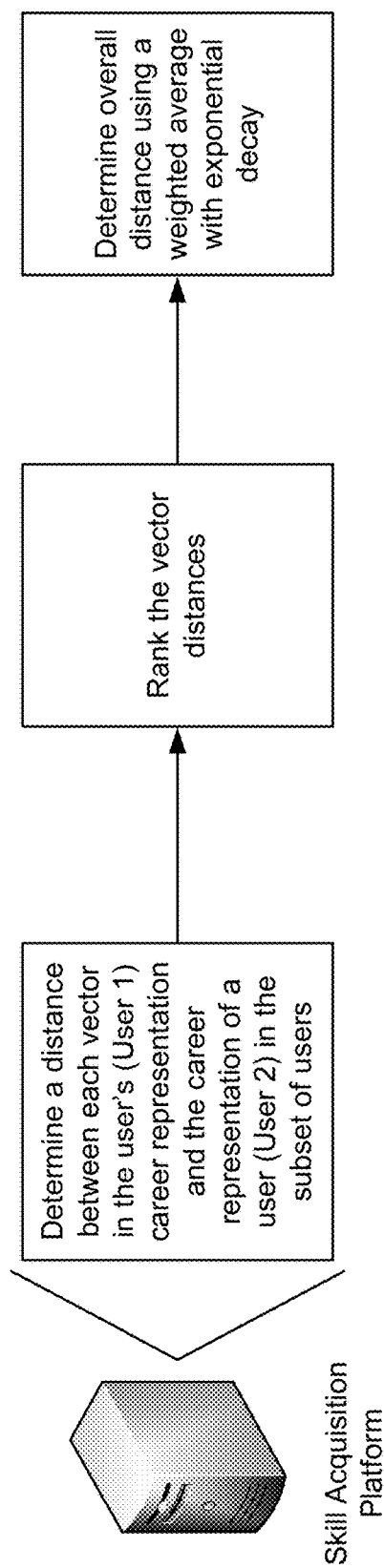

FIG. 1C illustrates an example similarity metric algorithm (e.g., example similarity metric algorithm 1). As shown in FIG. 1C, example similarity metric algorithm 1 may include the skill acquisition platform determining a distance (e.g., a Euclidean distance, a fractional distance, and/or the like) between each vector in the user's (referred to in example similarity metric algorithm 1 as "User 1") career presentation and each vector in the career representation of another user in the plurality of users (referred to in example similarity metric algorithm 1 as "User 2"). The distance between two vectors may an approximate indicator of how similar the two vectors are.

As further shown in FIG. 1C, example similarity metric algorithm 1 may include the skill acquisition platform ranking the distances between each vector pair of User 1 and User 2. In some implementations, the skill acquisition platform may rank the distances from greatest to least distance (e.g., [$sim_1, \ldots, sim_n$], where $sim_i$ represents the $i^{th}$ most similar vector pair). In some implementations, the skill acquisition platform may rank the distances from least distance to greatest distance (e.g., [$sim_1, \ldots, sim_m$], where $sim_i$ represents the $i^{th}$ least similar vector pair).

As further shown in FIG. 1C, example similarity metric algorithm 1 may include the skill acquisition platform determining an overall distance between the vectors of User 1 (and thus, the career representation, career trajectory, career progression, and/or the like of User 1) and the vectors of User 2 (and thus, the career representation, career trajectory, career progression, and/or the like of User 2). The overall distance may be the similarity metric of User 2.

In some implementations, the skill acquisition platform may determine the overall distance using a weighted average with exponential decay to ensure that vector pairs with lesser similarity have less influence on the similarity metric. For example, the skill acquisition platform may determine the overall distance based on Equation 1:

$$d(P_1, P_2) = \frac{\sum_{r=1}^{n} e^{-\lambda r} sim_r}{\sum_{r=1}^{n} e^{-\lambda r}}, \quad \text{Equation 1}$$

where $\lambda \in \mathbb{R}^+$ where $d(P_1, P_2)$ is the overall distance (and thus, the similarity metric) between the vectors of User 1 and the vectors of User 2. In some implementations, the skill acquisition platform may perform example similarity metric algorithm 1 for the remaining users in the plurality of users to generate similarity metrics for each of the plurality of users.

FIG. 1D illustrates an example similarity metric algorithm (e.g., example similarity metric algorithm 2). As shown in FIG. 1D, example similarity metric algorithm 2 may include the skill acquisition platform determining a first set of vector distances that include distances (e.g., a Euclidean distance, a fractional distance, and/or the like) between each vector in the user's (referred to in example similarity metric algorithm 2 as "User 1") career presentation and each vector in the career representation of another user in the plurality of users (referred to in example similarity metric algorithm 1 as "User 2"). The distance between two vectors may an approximate indicator of how similar the two vectors are.

As further shown in FIG. 1D, example similarity metric algorithm 2 may include the skill acquisition platform determining a second set of vector distances that includes distances between each vector in User 1's career representation and an average of each of the vectors included in User 2's career representation, and determining a third set of vector distances that includes distances between each vector in User 2's career representation and an average of each of the vectors included in User 1's career representation. The distance between a vector in User 1's career representation and the average of each of the vectors included in User 2's career representation may be an approximate indicator of how similar each vector of User 1 is to User 2's career representation. Similarly, the distance between a vector in User 2's career representation and the average of each of the vectors included in User 1's career representation may an approximate indicator of how similar each vector of User 2 is to User 1's career representation.

As further shown in FIG. 1D, example similarity metric algorithm 2 may include the skill acquisition platform ranking vector distances in the first set of vector distances, the second set of vector distances, and the third set of vector distances. For example, the skill acquisition platform may rank vector distances in the first set of vector distances, the second set of vector distances, and the third set of vector distances from least vector distance to greatest vector distance. As another example, the skill acquisition platform may rank vector distances in the first set of vector distances, the second set of vector distances, and the third set of vector distances from greatest vector distance to least vector distance.

As further shown in FIG. 1D, example similarity metric algorithm 2 may include the skill acquisition platform performing a summation of the ranked vector distances. For example, the skill acquisition platform may perform a summation of the ranked vector distances in ascending order (e.g., from least vector distance to greatest vector distance)

until every vector in User 1's career representation and User 2's career representation is included in the summation at least once. As another example, the skill acquisition platform may perform a summation of the ranked vector distances in descending order (e.g., from greatest vector distance to least vector distance) until every vector in User 1's career representation and User 2's career representation is included in the summation at least once.

As further shown in FIG. 1D, example similarity metric algorithm 2 may include the skill acquisition platform dividing the summation by a quantity of the ranked vector distances, included in the summation, to generate the similarity metric for User 2. In some implementations, the skill acquisition platform may perform example similarity metric algorithm 2 for the remaining users in the plurality of users to generate similarity metrics for each of the plurality of users.

Figure 1E:
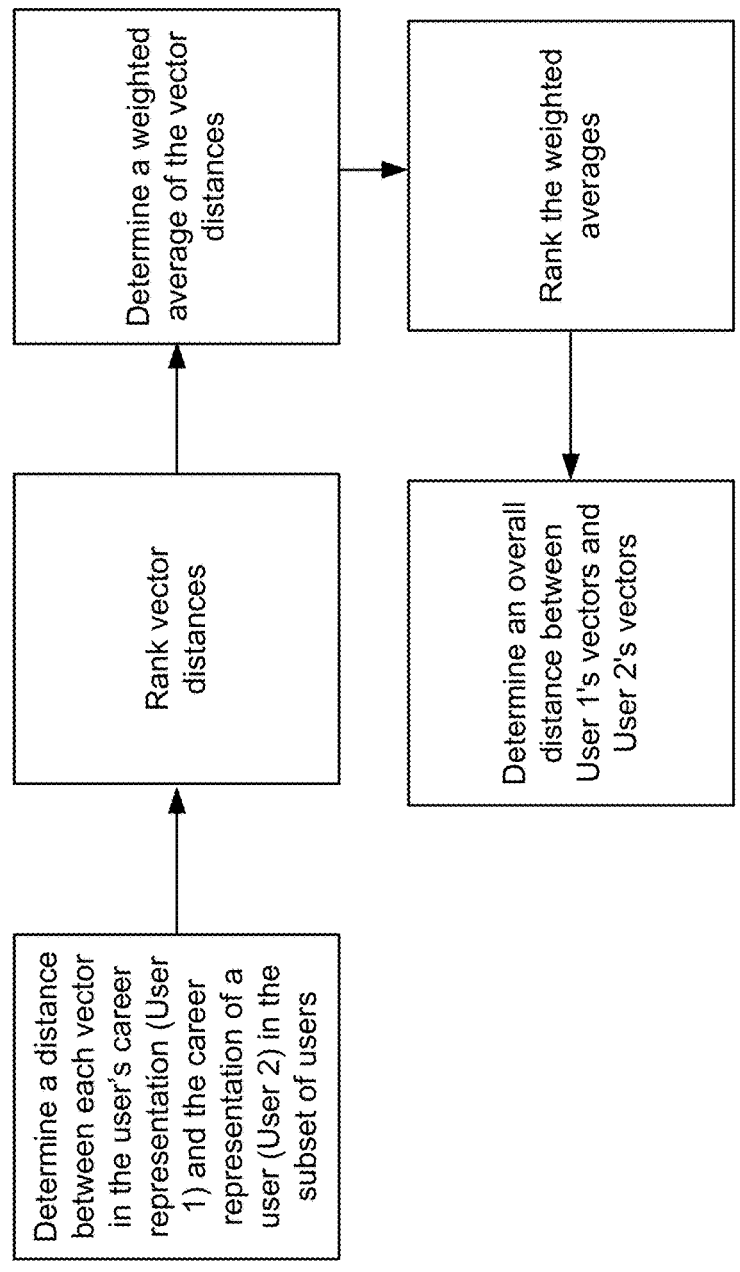
Figure 1E:
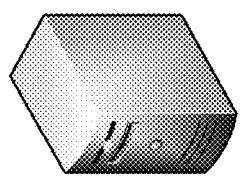

FIG. 1E illustrates an example similarity metric algorithm (e.g., example similarity metric algorithm 3). As shown in FIG. 1E, example similarity metric algorithm 3 may include the skill acquisition platform determining distances between each vector in the user's (referred to in example similarity metric algorithm 3 as "User 1") career presentation and each vector in the career representation of another user in the plurality of users (referred to in example similarity metric algorithm 3 as "User 2"). The distance between two vectors may an approximate indicator of how similar the two vectors are.

Figure 1F:
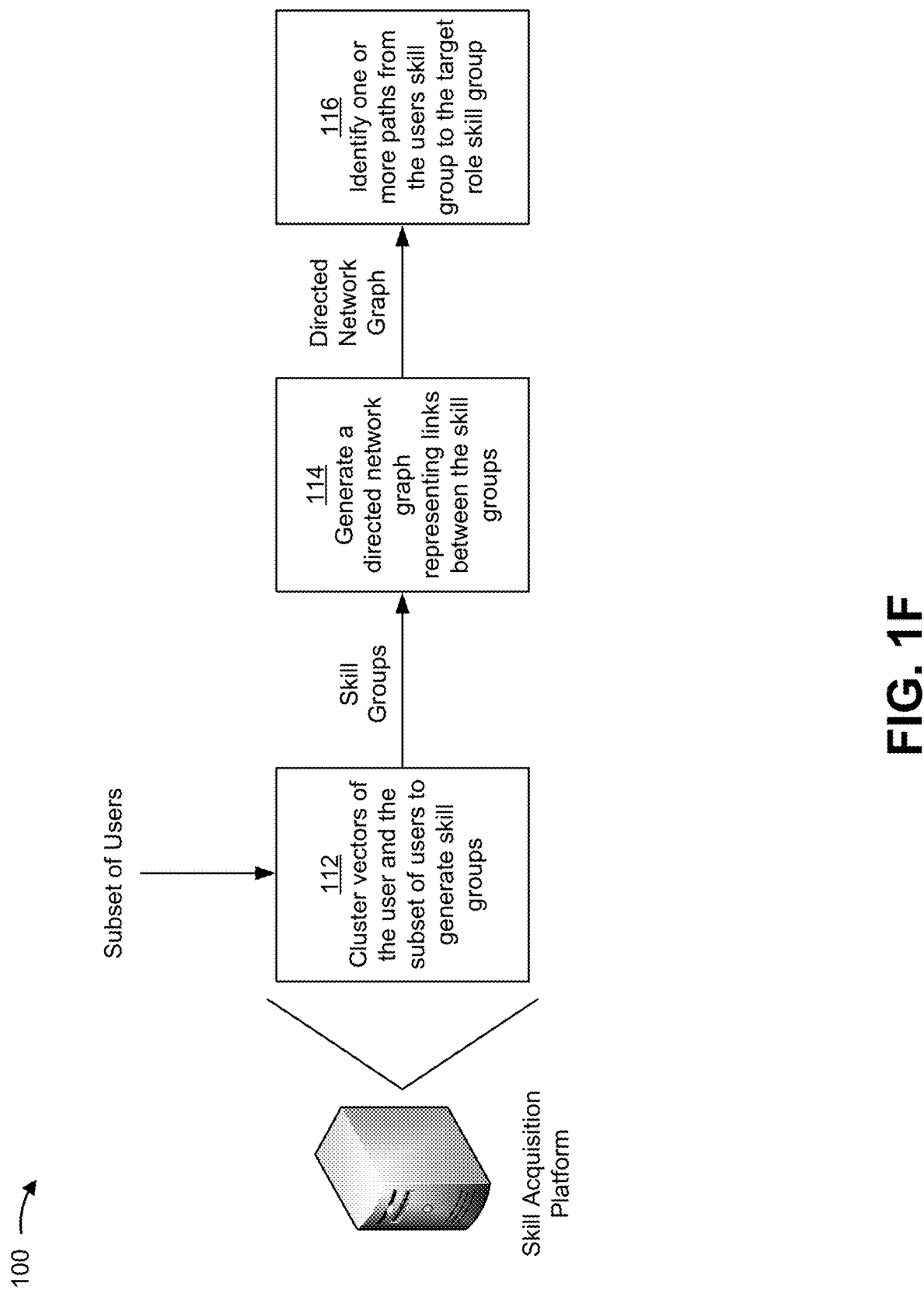

As further shown in FIG. 1F, example similarity metric algorithm 3 may include the skill acquisition platform determining a second set of vector distances that includes distances between each vector in User 1's career representation and an average of each of the vectors included in User 2's career representation, and determining a third set of vector distances that includes distances between each vector in User 2's career representation and an average of each of the vectors included in User 1's career representation. The distance between a vector in User 1's career representation and the average of each of the vectors included in User 2's career representation may an approximate indicator of how similar each vector of User 1 is to User 2's career representation. Similarly, the distance between a vector in User 2's career representation and the average of each of the vectors included in User 1's career representation may an approximate indicator of how similar each vector of User 2 is to User 1's career representation.

As further shown in FIG. 1E, example similarity metric algorithm 3 may include the skill acquisition platform ranking the distances between each vector pair of User 1 and User 2. In some implementations, the skill acquisition platform may rank the distances from greatest to least distance (e.g., [$sim_1, \ldots, sim_n$], where $sim_i$ represents the $i^{th}$ most similar vector pair). In some implementations, the skill acquisition platform may rank the distances from least distance to greatest distance (e.g., [$sim_1, \ldots, sim_m$], where $sim_i$ represents the $i^{th}$ least similar vector pair).

As further shown in FIG. 1E, example similarity metric algorithm 3 may include the skill acquisition platform determining weighted averages based on the ranked vector distances to determine a skill distance between User 1's career representation and User 2's vectors. In some implementations, the skill acquisition platform may determine the weighted average between User 1's career representation and the $j^{th}$ vector of User 2 based on Equation 2.

$$A_j = \frac{\sum_{r=1}^{n} \frac{1}{r^2} Sim_{r,j}}{\sum_{r=1}^{n} \frac{1}{r^2}} \quad \text{Equation 2}$$

As further shown in FIG. 1E, example similarity metric algorithm 3 may include the skill acquisition platform ranking the weighted averages. In some implementations, the skill acquisition platform may rank the weighted averages from least to greatest (e.g., [$A_1, A_2, \ldots, A_k$], where $A_t$ represents the $i^{th}$ most similar vector of User 2 to User 1's career representation). In some implementations, the skill acquisition platform may rank the weighted averages from least to greatest (e.g., [$A_1, A_2, \ldots, A_k$], where $A_t$ represents the $i^{th}$ least similar vector of User 2 to User 1's career representation).

As further shown in FIG. 1E, example similarity metric algorithm 3 may include the skill acquisition platform determining an overall distance between the vectors of User 1 (and thus, the career representation, career trajectory, career progression, and/or the like of User 1) and the vectors of User 2 (and thus, the career representation, career trajectory, career progression, and/or the like of User 2). The overall distance may be the similarity metric of User 2. In some implementations, the skill acquisition platform may determine the overall distance based on Equation 3:

$$d(P_1, P_2) = \frac{\sum_{r=1}^{j} \frac{1}{r} A_r}{\sum_{r=1}^{j} \frac{1}{r}} \quad \text{Equation 3}$$

where $d(P_1, P_2)$ is the overall distance (and thus, the similarity metric) between the vectors of User 1 and the vectors of User 2. In some implementations, the skill acquisition platform may perform example similarity metric algorithm 3 for the remaining users in the plurality of users to generate similarity metrics for each of the plurality of users.

In some implementations, once similarity metrics have been generated for each of the plurality of users, the skill acquisition platform may identify the subset of users from the plurality of users based on the similarity metrics. In this case, the skill acquisition platform may identify the subset of users as the users in the plurality of users that have similarity metrics that satisfy a similarity metric threshold, that are within a particular quantity of the highest or greatest similarity metrics, and/or the like. For example, the skill acquisition platform may identify the subset of users as the users in the plurality of users that have similarity metric of 80% similar or greater. As another example, the skill acquisition platform may identify the subset of users as the 20 users in the plurality of users with the highest similarity metrics.

As shown in FIG. 1F, and by reference number 112, the skill acquisition platform may cluster the vectors in the user's career representation along with the vectors in the career representations of the subset of users to generate skill groups. In this way, the commonality or prevalence of each employer, role, skill, certification, education, and/or other attribute within the career representations of the subset of users can be understood.

In some implementations, the skill acquisition platform may use various machine learning techniques to generate the skill groups. For example, the skill acquisition platform may use a K-means clustering algorithm to cluster the vectors in the user's career representation along with the vectors in the career representations of the subset of users into skill groups. In another example, the skill acquisition platform may use a density-based spatial clustering of applications with noise (DBSCAN) clustering algorithm to cluster the vectors in the user's career representation along with the vectors in the career representations of the subset of users into skill groups.

As further shown in FIG. 1F, and by reference number 114, the skill acquisition platform may generate a directed network graph representing links between skill groups and/or links between vectors in different skill groups. The links between the plurality of skill groups represent moves between skill groups and/or vectors in different skill groups taken by the subset of the users and the direction of the moves between skill groups and/or vectors. For example, a link between a vector in a first skill group and a vector in a second skill group may indicate that a user in the subset of users worked in an industry, obtained a particular certification after working in the industry, and then transitioned to another industry after obtaining the certification.

As further shown in FIG. 1F, and by reference number 116, the skill acquisition platform may identify one or more paths from the user's current skill group to the skill group associated with the target role. A path of the one or more paths may represent a particular set of vectors (e.g., skill, industry experience, certifications, education, and/or the like) that the user may add to the user's career representation, and the sequential or chronological order in which the user is to add the vectors the user's career representation, in order to obtain the target role (or be qualified for the target role). In some implementations, the skill acquisition platform may identify the one or more paths based on the links between the plurality of skill groups in the directed network graph.

In some implementations, the skill acquisition platform may identify the one or more paths using various algorithms to set or prioritize particular constraints. For example, to identify the shortest path(s) that the user may take to obtain the target role, the skill acquisition platform may identify the one or more shortest paths using Dijkstra's algorithm, depth-first search, and/or other shortest path algorithms to find the shortest paths between the user's current skill group to the skill group associated with the target role. As another example, to identify the most comprehensive path(s) that the user may take to obtain the target role, the skill acquisition platform may identify the one or more shortest paths using a breadth-first search to find the paths between the user's current skill group to the skill group associated with the target role that include the greatest quantity of vectors and/or skill groups. As another example, the skill acquisition platform may identify paths that occur the most frequently in the directed network graph to identify the paths most frequently taken by the subset of users.

Figure 1G:
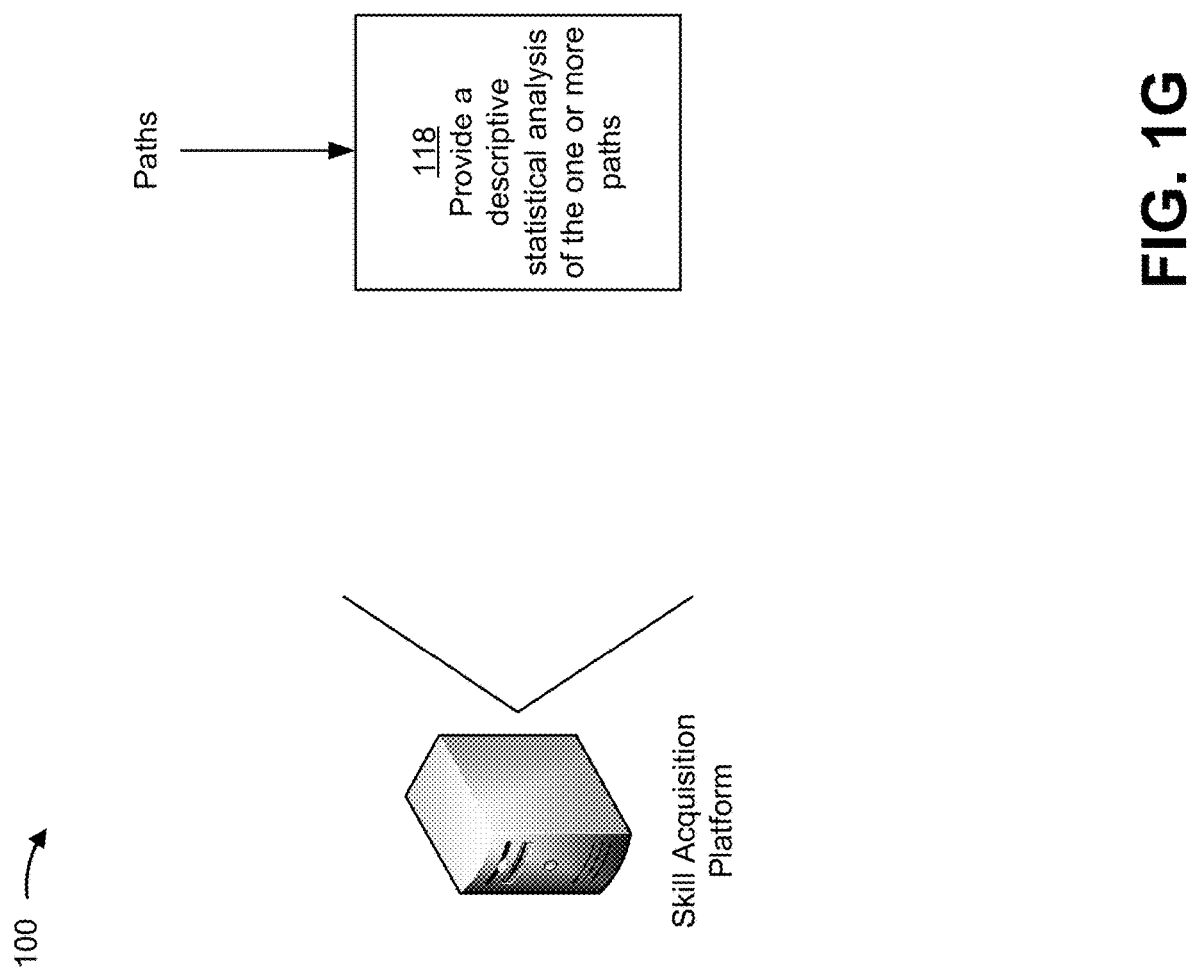

As shown in FIG. 1G, and by reference number 118, the skill acquisition platform may provide a descriptive statistical analysis of the one or more paths. In some implementations, the skill acquisition platform may provide the descriptive statistical analysis of the one or more paths to the user device, to other user devices, to a server device, may display the descriptive statistical analysis on the skill acquisition platform or a display communicatively connected to the skill acquisition platform, and/or the like.

In some implementations, the descriptive statistical analysis may include a textual, numerical, and/or graphical representation of statistics of the one or more paths, may visually display a graphic representation of the one or more paths (e.g., in the context of a visual display of the directed network graph), and/or other information and content. For example, the descriptive statistical analysis may include an estimated path length for each of the one or more paths (e.g., a quantity of vectors and associated links in a path, an estimated amount of time to obtain each vector in a path, and/or the like). As another example, the descriptive statistical analysis may include one or more links of statistical interest included in the one or more paths. A link of statistical interest may include a link between vectors or skill groups that occurs most frequently in the one or more paths, that occurs at least a threshold quantity of times in the one or more paths, that is the longest estimated link (e.g., the longest transition between vectors or skill groups), and/or the like. As another example, the descriptive statistical analysis may include an estimated difficulty or feasibility of each of the one or more paths. As another example, the descriptive statistical analysis may include a frequency of occurrence of each of the one or more paths (e.g., a quantity of times that a particular path is included in the one or more paths).

In some implementations, the skill acquisition platform may perform one or more automated actions based on identifying the one or more paths and/or based on the descriptive statistical analysis of the one or more paths. For example, the skill acquisition platform may automatically enroll the user in an educational program, a class to obtain a skill, and/or a certification course based on the one or more paths and/or the descriptive statistical analysis (e.g., based on determining that a particular education, skill, or certification occurred most frequently in the one or more paths, based on determining that a particular education, skill, or certification occurred above a threshold quantity of times in the one or more paths, and/or the like). As another example, the skill acquisition platform may automatically identify and/or display job postings based on the one or more paths and/or the descriptive statistical analysis (e.g., based on determining that a particular employment or industry experience occurred most frequently in the one or more paths, based on determining that a particular employment or industry experience occurred above a threshold quantity of times in the one or more paths, and/or the like).

In this way, the skill acquisition platform may automatically analyze data sets to generate knowledge graphs, may use a machine learning model for relational learning on the knowledge graphs to generate embedding vectors, may use machine learning clustering algorithms, shortest path algorithms, breadth-first algorithms, and/or other algorithms to identify similar users that have obtained the target role of the user, and to identify one or more paths, based on the similar users, that the user may take in order to obtain the skills, industry experiences, certifications, education, and/or the like that will position the user to obtain the target role with high likelihood. In this way, the skill acquisition platform may generate a descriptive analysis of the one or more paths, which may provide a detailed visualization of the one or more paths, may provide actionable recommendations for training, education, and industry experience, may provide a difficulty and/or a feasibility analysis of the one or more paths in a manner that conserves computing resources, networking resources, and/or the like that would otherwise be wasted by the user trying to subjectively, aimlessly, and/or arbitrarily perform Internet searching for career development, skill acquisition, and/or the like. Moreover, in this way, the skill acquisition platform may automatically perform one or more actions based on the one or more paths, such as automatically enroll the user in training and/or certification courses, may automatically identify job postings to obtain recommended industry experience, and/or may perform other automatic actions.

As indicated above, FIGS. 1A-1G are provided merely as one or more examples. Other examples may differ from what is described with regard to FIGS. 1A-1G. In some implementations, FIGS. 1A-1G may include obtaining, by the skill acquisition platform, a set of knowledge graph embeddings, the knowledge graph embeddings representing current skillset data, the current skillset data including a career parameter; receiving, by the skill acquisition platform, input identifying a skillset for a user; determining, by the skill acquisition platform, a career vector set based on vector triples in the embedding space; determining, by the skill acquisition platform, the number of vectors in each career parameter; determining, by the skill acquisition platform, a similarity score between each vector in a 1st career parameter and each vector in a 2nd career parameter; clustering, by the skill acquisition platform, the vectors based on the similarity scores to generate a plurality of skill groups; generating, by the skill acquisition platform, a directed network graph based on the cluster, the directed network graph representing links between the plurality of skill groups; determining, by the skill acquisition platform, a weighting score for each edge in the directed network graph based on a sequence of the vectors and based on the clusters; and identifying, by the skill acquisition platform, one or more optimum paths between a current skillset associated with the user and the target skillset based on the weighted scores.

Figure 2:
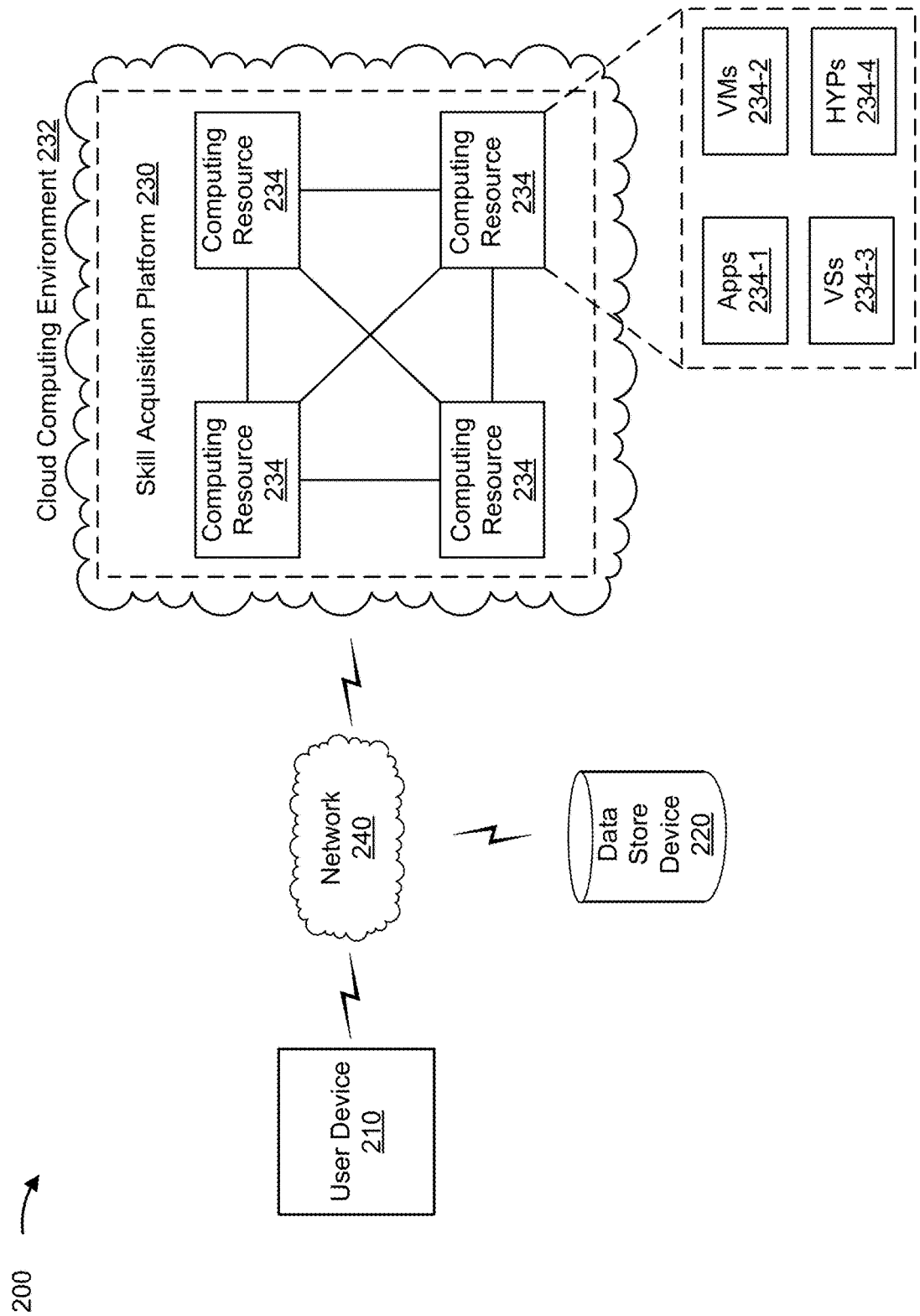
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a data store device 220, a skill acquisition platform 230, and a network 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a desktop computer, or a similar type of device. In some implementations, user device 210 may receive input from a user. The input may include input identifying a target role for the user or for another user, may include an instruction to identify skill/career development paths for the user to obtain the target role, and/or the like. In some implementations, user device 210 may receive a descriptive statistical analysis of one or more paths associated with the target role, may display one or more aspects of the descriptive statistical analysis (e.g., on a display of user device 210 or a display of another device), and/or the like.

Data store device 220 includes one or more devices capable of receiving, storing, and/or providing information, such as information described herein. For example, data store device 220 may include a hard disk drive, a solid state drive, network attached storage, a storage array (e.g., a redundant array of independent disks (RAID) and/or another type of storage array), a storage server, a cloud storage deployment, a non-volatile memory device, or a similar type of device. In some implementations, data store device 220 may implement and provide a data store that may be accessed by user device 210 and/or skill acquisition platform 230. In some implementations, the data store may store career data associated with one or more users, resume data associated with one or more users, and/or the like. In some implementations, data store device 220 may provide data sets of resume data, career data, and/or the like to skill acquisition platform 230 (e.g., based on receiving a request for the data set from skill acquisition platform 230, based on identifying a request for skill/career development paths for a target career or skill from user device 210, and/or the like.

Skill acquisition platform 230 includes one or more devices capable of identifying or receiving input identifying a target role for a user (e.g., from user device 210 and/or another device), capable of identifying, based on a respective career representation for each of a plurality of users, users from the plurality of users that have worked in the target role, capable of identifying, based on a similarity metric, a subset of the users that have worked in the target role and have similar career trajectories to the user, capable of clustering vectors of the user and vectors of the subset of the users that have worked in the target role to generate a plurality of skill groups, capable of generating a directed network graph that represents links between the plurality of skill groups, capable of identifying one or more paths between a first skill group, of the plurality of skills groups, associated with the user and a second skill group, of the plurality of skill groups, associated with the target role, capable of automatically generating a descriptive analysis of the one or more paths, and/or the like.

In some implementations, skill acquisition platform 230 includes one or more devices capable of generating a knowledge graph on a data set (e.g., a data set stored by data store device 220) that includes resume data from the plurality of users, capable of generating, based on the knowledge graph, a plurality of vectors for the plurality of users, capable of generating a respective career representation for each of the plurality of users, and/or the like. In some implementations, skill acquisition platform 230 includes one or more devices capable of generating similarity metrics for one or more users. In some implementations, skill acquisition platform 230 includes one or more devices capable of automatically enrolling a user in a class to obtain a skill included in one or more paths, capable of automatically identifying one or more job postings associated with a role included in one or more paths, capable of automatically transmitting (e.g., to user device 210) an instruction to display a class or one or more job postings, capable of automatically transmitting (e.g., to user device 210) an instruction to display a visual representation of one or more paths, and/or the like.

In some implementations, skill acquisition platform 230 includes one or more devices capable of obtaining a set of knowledge graph embeddings, the knowledge graph embeddings representing current skillset data, the current skillset data including a career parameter; receiving input identifying a skillset for a user; determining a career vector set based on vector triples in the embedding space; determining the number of vectors in each career parameter; determining a similarity score between each vector in a 1st career parameter and each vector in a 2nd career parameter; clustering the vectors based on the similarity scores to generate a plurality of skill groups; generating a directed network graph based on the cluster, the directed network graph representing links between the plurality of skill groups; determining a weighting score for each edge in the directed network graph based on a sequence of the vectors and based on the clusters;

identifying one or more optimum paths between a current skillset associated with the user and the target skillset based on the weighted scores, and/or the like.

In some implementations, skill acquisition platform 230 may be designed to be modular such that certain software components may be swapped in or out depending on a particular need. As such, skill acquisition platform 230 may be easily and/or quickly reconfigured for different uses. In some implementations, skill acquisition platform 230 may receive information from and/or transmit information to user device 210, data store device 220, and/or the like.

In some implementations, as shown, skill acquisition platform 230 may be hosted in a cloud computing environment 232. Notably, while implementations described herein describe skill acquisition platform 230 as being hosted in cloud computing environment 232, in some implementations, skill acquisition platform 230 may not be cloud-based (i.e., may be implemented outside of a cloud computing environment) or may be partially cloud-based. Cloud computing environment 232 includes an environment that hosts skill acquisition platform 230. Cloud computing environment 232 may provide computation, software, data access, storage, etc. services that do not require end-user knowledge of a physical location and configuration of system(s) and/or device(s) that hosts skill acquisition platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host skill acquisition platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by one or more other devices. Application 234-1 may eliminate a need to install and execute the software applications on the one or more other devices. For example, application 234-1 may include software associated with skill acquisition platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of another device or an operator of skill acquisition platform 230), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
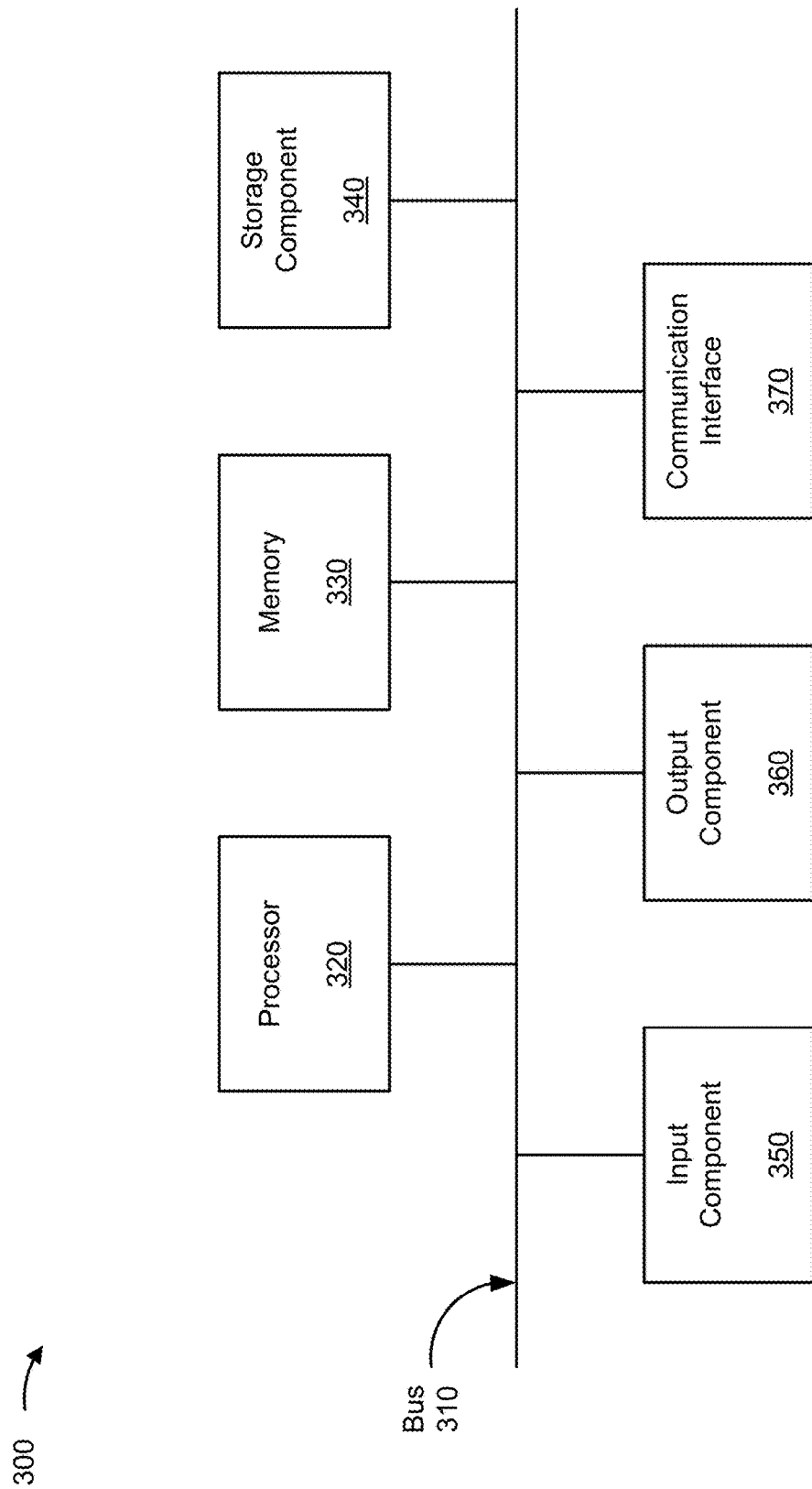
FIG. 3 is a diagram of example components of one or more devices of FIG. 2.

FIG. 3 is a diagram of example components of a device 300. Device 300 may correspond to user device 210, data store device 220, skill acquisition platform 230, computing resource 234, and/or one or more devices included in network 240. In some implementations, user device 210, data store device 220, skill acquisition platform 230, computing resource 234, and/or one or more devices included in network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a quantum processing unit (QPU) (e.g., which may be used to provide a quantum computing environment), central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
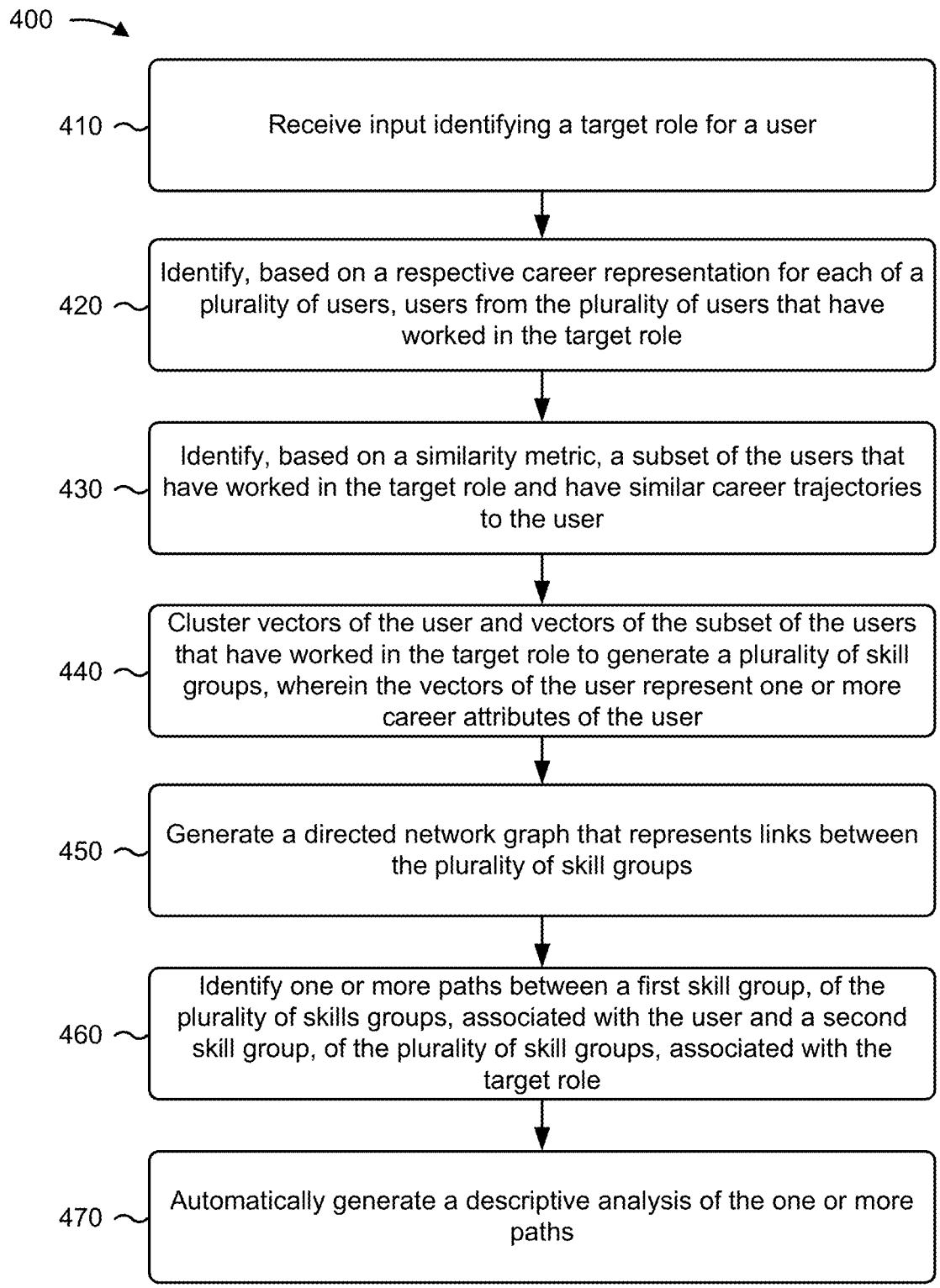
FIGS. 4-9 are flow charts of example processes for identifying one or more paths for skill acquisition.

FIG. 4 is a flow chart of an example process 400 for identifying one or more paths for skill acquisition. In some implementations, one or more process blocks of FIG. 4 may be performed by a skill acquisition platform (e.g., skill acquisition platform 230). In some implementations, one or more process blocks of FIG. 4 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 4, process 400 may include receiving input identifying a target role for a user (block 410). For example, the skill acquisition platform (e.g., using processor 320, memory 330, storage component 340, input component 350, output component 360, communication interface 370, and/or the like) may receive input identifying a target role for a user, as described above.

As further shown in FIG. 4, process 400 may include identifying, based on a respective career representation for each of a plurality of users, users from the plurality of users that have worked in the target role (block 420). For example, the skill acquisition platform (e.g., using processor 320, memory 330, storage component 340, input component 350, output component 360, communication interface 370, and/or the like) may identify, based on a respective career representation for each of a plurality of users, users from the plurality of users that have worked in the target role, as described above.

As further shown in FIG. 4, process 400 may include identifying, based on a similarity metric, a subset of the users that have worked in the target role and have similar career trajectories to the user (block 430). For example, the skill acquisition platform (e.g., using processor 320, memory 330, storage component 340, input component 350, output component 360, communication interface 370, and/or the like) may identify, based on a similarity metric, a subset of the users that have worked in the target role and have similar career trajectories to the user, as described above.

As further shown in FIG. 4, process 400 may include clustering vectors of the user and vectors of the subset of the users that have worked in the target role to generate a plurality of skill groups, wherein the vectors of the user represent one or more career attributes of the user (block 440). For example, the skill acquisition platform (e.g., using processor 320, memory 330, storage component 340, input component 350, output component 360, communication interface 370, and/or the like) may cluster vectors of the user and vectors of the subset of the users that have worked in the target role to generate a plurality of skill groups, as described above. In some implementations, the vectors of the user represent one or more career attributes of the user.

As further shown in FIG. 4, process 400 may include generating a directed network graph that represents links between the plurality of skill groups (block 450). For example, the skill acquisition platform (e.g., using processor 320, memory 330, storage component 340, input component 350, output component 360, communication interface 370, and/or the like) may generate a directed network graph that represents links between the plurality of skill groups, as described above.

As further shown in FIG. 4, process 400 may include identifying one or more paths between a first skill group, of the plurality of skills groups, associated with the user and a second skill group, of the plurality of skill groups, associated with the target role (block 460). For example, the skill acquisition platform (e.g., using processor 320, memory 330, storage component 340, input component 350, output component 360, communication interface 370, and/or the like) may identify one or more paths between a first skill group, of the plurality of skills groups, associated with the user and a second skill group, of the plurality of skill groups, associated with the target role, as described above.

As further shown in FIG. 4, process 400 may include automatically generating a descriptive analysis of the one or more paths (block 470). For example, the skill acquisition platform (e.g., using processor 320, memory 330, storage component 340, input component 350, output component 360, communication interface 370, and/or the like) may automatically generate a descriptive analysis of the one or more paths, as described above.

Process 400 may include additional implementations, such as any single implementation or any combination of implementations described below and/or in connection with one or more other processes described elsewhere herein.

In a first implementation, process 400 includes generating a knowledge graph on a data set that includes resume data from the plurality of users; generating, based on the knowledge graph, a plurality of vectors for the plurality of users; and generating the respective career representation for each of the plurality of users, wherein each career representation includes one or more vectors of the plurality of vectors. In a second implementation, alone or in combination with the first implementation, generating the plurality of vectors comprises generating the plurality of vectors using a machine learning model on the knowledge graph. In a third implementation, alone or in combination with one or more of the first and second implementations, the subset of the users are associated with similarity metrics that satisfy a similarity metric threshold.

In a fourth implementation, alone or in combination with one or more of the first through third implementations, identifying, based on the similarity metric, the subset of the users that have worked in the target role comprises determining vector distances between each of the vectors of the user and each of vectors of another user included in the users that have worked in the target role; ranking the vector distances from least to greatest, and determining an overall distance between the user and the other user using a weighted average with exponential decay. In a fifth implementation, alone or in combination with one or more of the first through fourth implementations, the descriptive analysis of the one or more paths identifies at least one of a graphical representation of the one or more paths, an estimated path length for each of the one or more paths, one or more links of statistical interest included in the one or more paths, an estimated difficulty of each of the one or more paths, or a frequency of occurrence of each of the one or more paths. In a sixth implementation, alone or in combination with one or more of the first through fifth implementations, identifying the one or more paths comprises identifying the one or more paths using at least one of Dijkstra's algorithm, or a breadth-first search.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
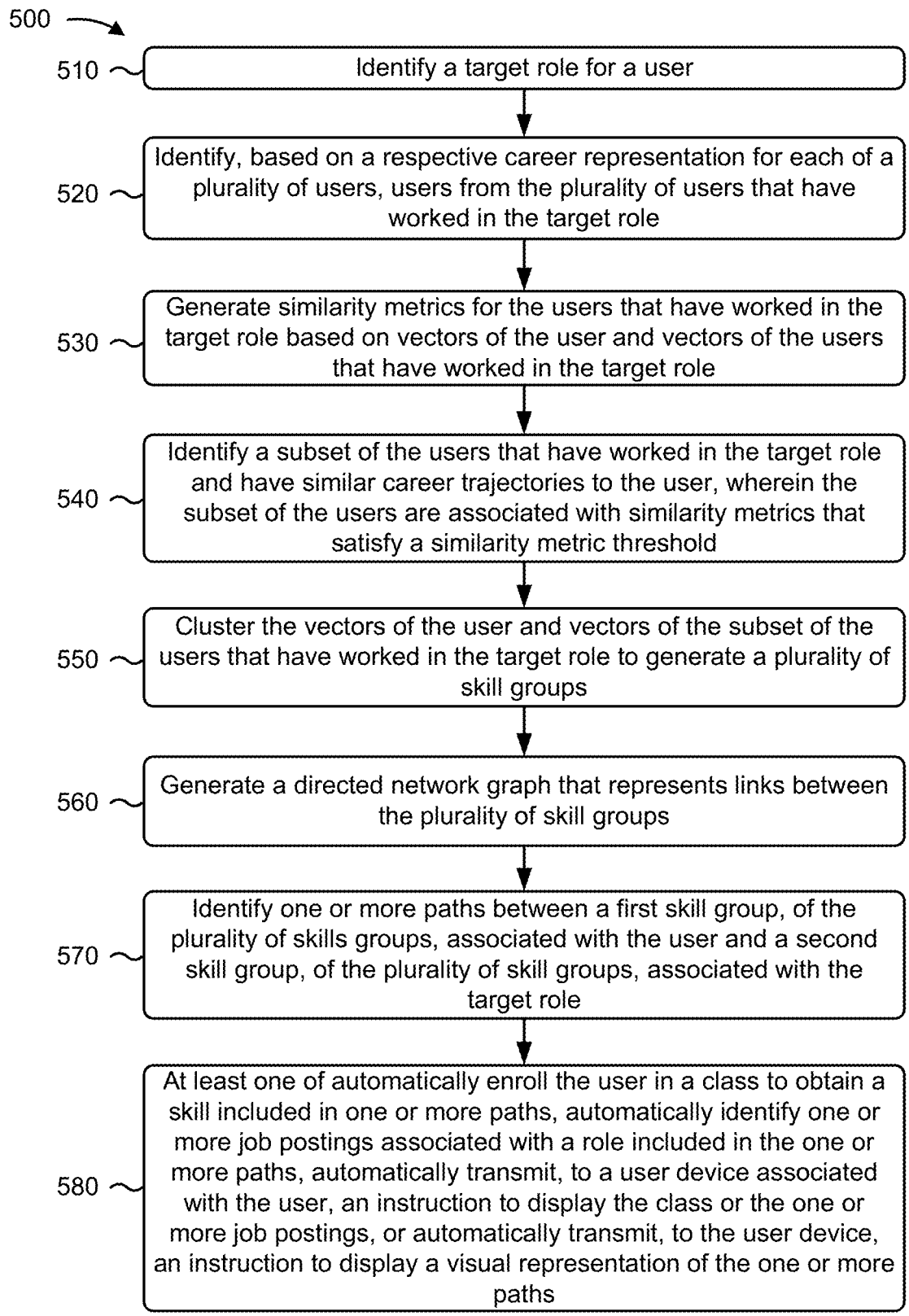

FIG. 5 is a flow chart of an example process 500 for identifying one or more paths for skill acquisition. In some implementations, one or more process blocks of FIG. 5 may be performed by a skill acquisition platform (e.g., skill acquisition platform 230). In some implementations, one or more process blocks of FIG. 5 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 5, process 500 may include identifying a target role for a user (block 510). For example, the skill acquisition platform (e.g., using processor 320, memory 330, storage component 340, input component 350, output component 360, communication interface 370, and/or the like) may identify a target role for a user, as described above.

As further shown in FIG. 5, process 500 may include identifying, based on a respective career representation for each of a plurality of users, users from the plurality of users that have worked in the target role (block 520). For example, the skill acquisition platform (e.g., using processor 320, memory 330, storage component 340, input component 350, output component 360, communication interface 370, and/or the like) may identify, based on a respective career representation for each of a plurality of users, users from the plurality of users that have worked in the target role, as described above.

As further shown in FIG. 5, process 500 may include generating similarity metrics for the users that have worked in the target role based on vectors of the user and vectors of the users that have worked in the target role (block 530). For example, the skill acquisition platform (e.g., using processor 320, memory 330, storage component 340, input component 350, output component 360, communication interface 370 and/or the like) may generate similarity metrics for the users that have worked in the target role based on vectors of the user and vectors of the users that have worked in the target role, as described above.

As further shown in FIG. 5, process 500 may include identifying a subset of the users that have worked in the target role and have similar career trajectories to the user, wherein the subset of the users are associated with similarity metrics that satisfy a similarity metric threshold (block 540). For example, the skill acquisition platform (e.g., using processor 320, memory 330, storage component 340, input component 350, output component 360, communication interface 370 and/or the like) may identify a subset of the users that have worked in the target role and have similar career trajectories to the user, as described above. In some implementations, the subset of the users are associated with similarity metrics that satisfy a similarity metric threshold.

As further shown in FIG. 5, process 500 may include clustering the vectors of the user and vectors of the subset of the users that have worked in the target role to generate a plurality of skill groups (block 550). For example, the skill acquisition platform (e.g., using processor 320, memory 330, storage component 340, input component 350, output component 360, communication interface 370 and/or the like) may cluster the vectors of the user and vectors of the subset of the users that have worked in the target role to generate a plurality of skill groups, as described above.

As further shown in FIG. 5, process 500 may include generating a directed network graph that represents links between the plurality of skill groups (block 560). For example, the skill acquisition platform (e.g., using processor 320, memory 330, storage component 340, input component 350, output component 360, communication interface 370 and/or the like) may generate a directed network graph that represents links between the plurality of skill groups, as described above.

As further shown in FIG. 5, process 500 may include identifying one or more paths between a first skill group, of the plurality of skills groups, associated with the user and a second skill group, of the plurality of skill groups, associated with the target role (block 570). For example, the skill acquisition platform (e.g., using processor 320, memory 330, storage component 340, input component 350, output component 360, communication interface 370 and/or the like) may identify one or more paths between a first skill group, of the plurality of skills groups, associated with the user and a second skill group, of the plurality of skill groups, associated with the target role, as described above.

As further shown in FIG. 5, process 500 may include at least one of automatically enrolling the user in a class to obtain a skill included in one or more paths, automatically identifying one or more job postings associated with a role included in the one or more paths, automatically transmitting, to a user device associated with the user, an instruction to display the class or the one or more job postings, or automatically transmitting, to the user device, an instruction to display a visual representation of the one or more paths (block 580). For example, the skill acquisition platform (e.g., using processor 320, memory 330, storage component 340, input component 350, output component 360, communication interface 370 and/or the like) may at least one of automatically enroll the user in a class to obtain a skill included in one or more paths, automatically identify one or more job postings associated with a role included in the one or more paths, automatically transmit, to a user device associated with the user, an instruction to display the class or the one or more job postings, or automatically transmit, to the user device, an instruction to display a visual representation of the one or more paths, as described above.

Process 500 may include additional implementations, such as any single implementation or any combination of implementations described below and/or in connection with one or more other processes described elsewhere herein.

In a first implementation, process 500 includes determining a first set of vector distances between each of the vectors of the user and each of vectors of another user included in the users that have worked in the target role; determining a second set of vector distances between each of the vectors of the user and an average of each of the vectors of the other user included in the users that have worked in the target role; determining a third set of vector distances between each of the vectors of the other user and an average of each of the vectors of the user; ranking vector distances in the first set of vector distances, the second set of vector distances, and the third set of vector distances from least to greatest or greatest to least; and performing a summation of the ranked vector distances from least to greatest or greatest to least; and dividing the summation by a quantity of the ranked vector distances to generate the similarity metrics.

In a second implementation, alone or in combination with the first implementation, process 500 includes generating a knowledge graph on a data set that includes resume data from the plurality of users; generating, based on the knowledge graph, a plurality of vectors for the plurality of users; and generating the respective career representation for each of the plurality of users, wherein each career representation includes one or more vectors of the plurality of vectors. In a third implementation, alone or in combination with one or more of the first and second implementations, process 500 includes generating a descriptive analysis of the one or more paths that identifies at least one of a graphical representation of the one or more paths, an estimated path length for each of the one or more paths, one or more links of statistical interest included in the one or more paths, an estimated difficulty of each of the one or more paths, or a frequency of occurrence of each of the one or more paths.

In a fourth implementation, alone or in combination with one or more of the first through third implementations, the links between the plurality of skill groups represent moves between skill groups taken by the subset of the users that have worked in the target role. In a fifth implementation, alone or in combination with one or more of the first through fourth implementations, a vector, of the vectors of the user or the vectors of the subset of the users that have worked in the target role, comprises at least one of a user vector, a skill vector, an experience vector, an industry vector, an education vector, or a certification vector. In a sixth implementation, alone or in combination with one or more of the first through fifth implementations, process 500 includes identifying the one or more paths using at least one of Dijkstra's algorithm, or a breadth-first search.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
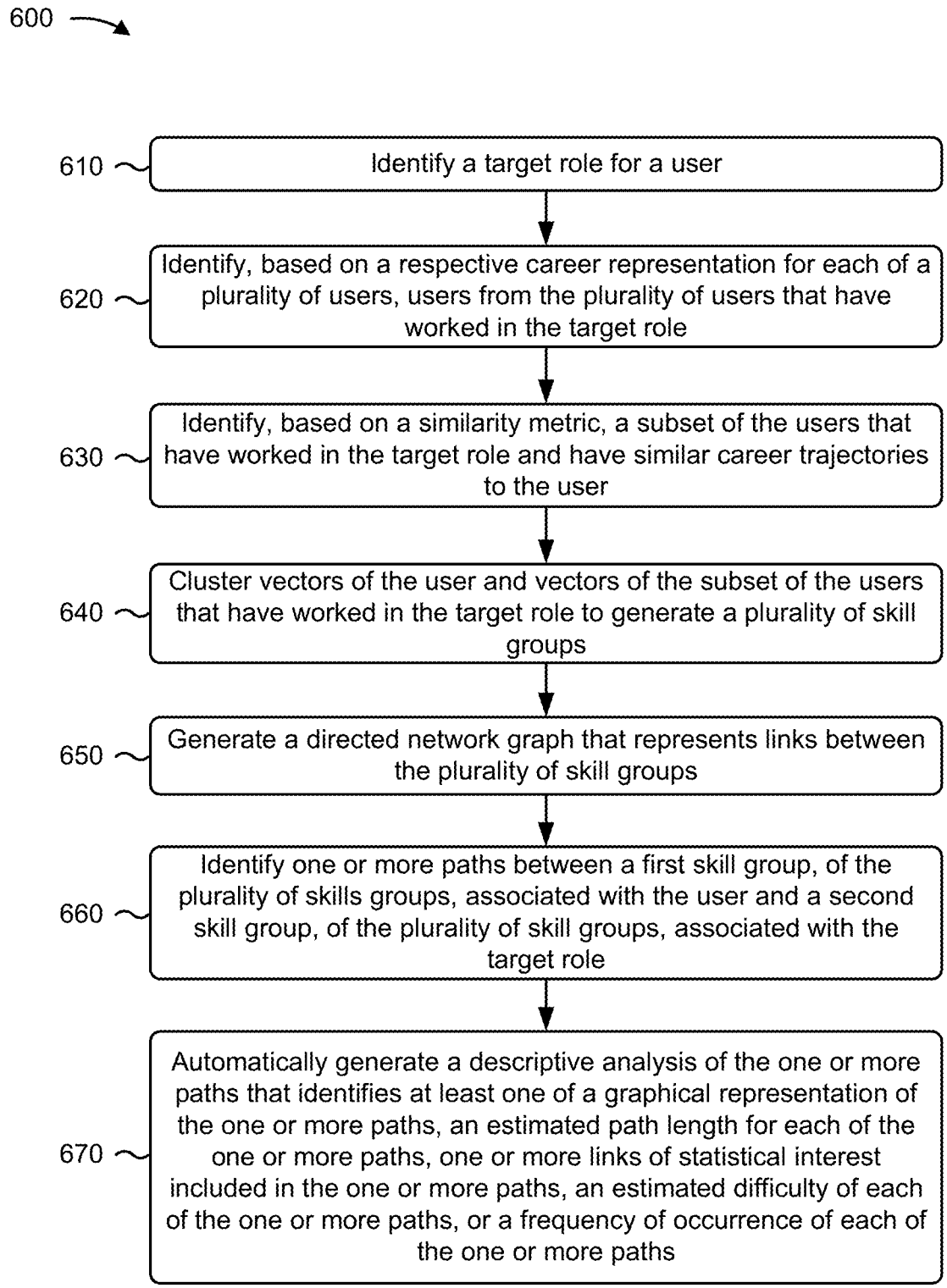

FIG. 6 is a flow chart of an example process 600 for identifying one or more paths for skill acquisition. In some implementations, one or more process blocks of FIG. 6 may be performed by a skill acquisition platform (e.g., skill acquisition platform 230). In some implementations, one or more process blocks of FIG. 6 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 6, process 600 may include identifying a target role for a user (block 610). For example, the skill acquisition platform (e.g., using processor 320, memory 330, storage component 340, input component 350, output component 360, communication interface 370 and/or the like) may identify a target role for a user, as described above.

As further shown in FIG. 6, process 600 may include identifying, based on a respective career representation for each of a plurality of users, users from the plurality of users that have worked in the target role (block 620). For example, the skill acquisition platform (e.g., using processor 320, memory 330, storage component 340, input component 350, output component 360, communication interface 370 and/or the like) may identify, based on a respective career representation for each of a plurality of users, users from the plurality of users that have worked in the target role, as described above.

As further shown in FIG. 6, process 600 may include identifying, based on a similarity metric, a subset of the users that have worked in the target role and have similar career trajectories to the user (block 630). For example, the skill acquisition platform (e.g., using processor 320, memory 330, storage component 340, input component 350, output component 360, communication interface 370 and/or the like) may identify, based on a similarity metric, a subset of the users that have worked in the target role and have similar career trajectories to the user, as described above.

As further shown in FIG. 6, process 600 may include clustering vectors of the user and vectors of the subset of the users that have worked in the target role to generate a plurality of skill groups (block 640). For example, the skill acquisition platform (e.g., using processor 320, memory 330, storage component 340, input component 350, output component 360, communication interface 370 and/or the like) may cluster vectors of the user and vectors of the subset of the users that have worked in the target role to generate a plurality of skill groups, as described above.

As further shown in FIG. 6, process 600 may include generating a directed network graph that represents links between the plurality of skill groups (block 650). For example, the skill acquisition platform (e.g., using processor 320, memory 330, storage component 340, input component 350, output component 360, communication interface 370 and/or the like) may generate a directed network graph that represents links between the plurality of skill groups, as described above.

As further shown in FIG. 6, process 600 may include identifying one or more paths between a first skill group, of the plurality of skills groups, associated with the user and a second skill group, of the plurality of skill groups, associated with the target role (block 660). For example, the skill acquisition platform (e.g., using processor 320, memory 330, storage component 340, input component 350, output component 360, communication interface 370 and/or the like) may identify one or more paths between a first skill group, of the plurality of skills groups, associated with the user and a second skill group, of the plurality of skill groups, associated with the target role, as described above.

As further shown in FIG. 6, process 600 may include automatically generating a descriptive analysis of the one or more paths that identifies at least one of a graphical representation of the one or more paths, an estimated path length for each of the one or more paths, one or more links of statistical interest included in the one or more paths, an estimated difficulty of each of the one or more paths, or a frequency of occurrence of each of the one or more paths (block 670). For example, the skill acquisition platform (e.g., using processor 320, memory 330, storage component 340, input component 350, output component 360, communication interface 370 and/or the like) may automatically generate a descriptive analysis of the one or more paths that identifies at least one of a graphical representation of the one or more paths, an estimated path length for each of the one or more paths, one or more links of statistical interest included in the one or more paths, an estimated difficulty of each of the one or more paths, or a frequency of occurrence of each of the one or more paths, as described above.

Process 600 may include additional implementations, such as any single implementation or any combination of implementations described below and/or in connection with one or more other processes described elsewhere herein.

In a first implementation, process 600 includes determining vector distances between each of the vectors of the user and each vector of another user included in the users that have worked in the target role; ranking the vector distances from least to greatest or greatest to least; determining weighted averages based on the ranked vector distances, wherein the weighted averages represent skill distances between a career representation of the user and the vectors of the other user; performing a summation of the weighted averages from least to greatest or greatest to least; and dividing the summation by a quantity of the weighted averages to generate the similarity metric for the other user. In a second implementation, alone or in combination with the first implementation, the subset of the users are associated with similarity metrics that satisfy a similarity metric threshold.

In a third implementation, alone or in combination with one or more of the first and second implementations, the links between the plurality of skill groups represent moves between skill groups taken by the subset of the users that have worked in the target role. In a fourth implementation, alone or in combination with one or more of the first through third implementations, a vector, of the vectors of the user or the vectors of the subset of the users that have worked in the target role, comprises at least one of: a user vector, a skill vector, an experience vector, an industry vector, an education vector, or a certification vector. In a fifth implementation, alone or in combination with one or more of the first through fourth implementations, process 600 includes generating a knowledge graph on a data set that includes resume data from the plurality of users; generating, based on the knowledge graph, a plurality of vectors for the plurality of users; and generating the respective career representation for each of the plurality of users, wherein each career representation includes one or more vectors of the plurality of vectors.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
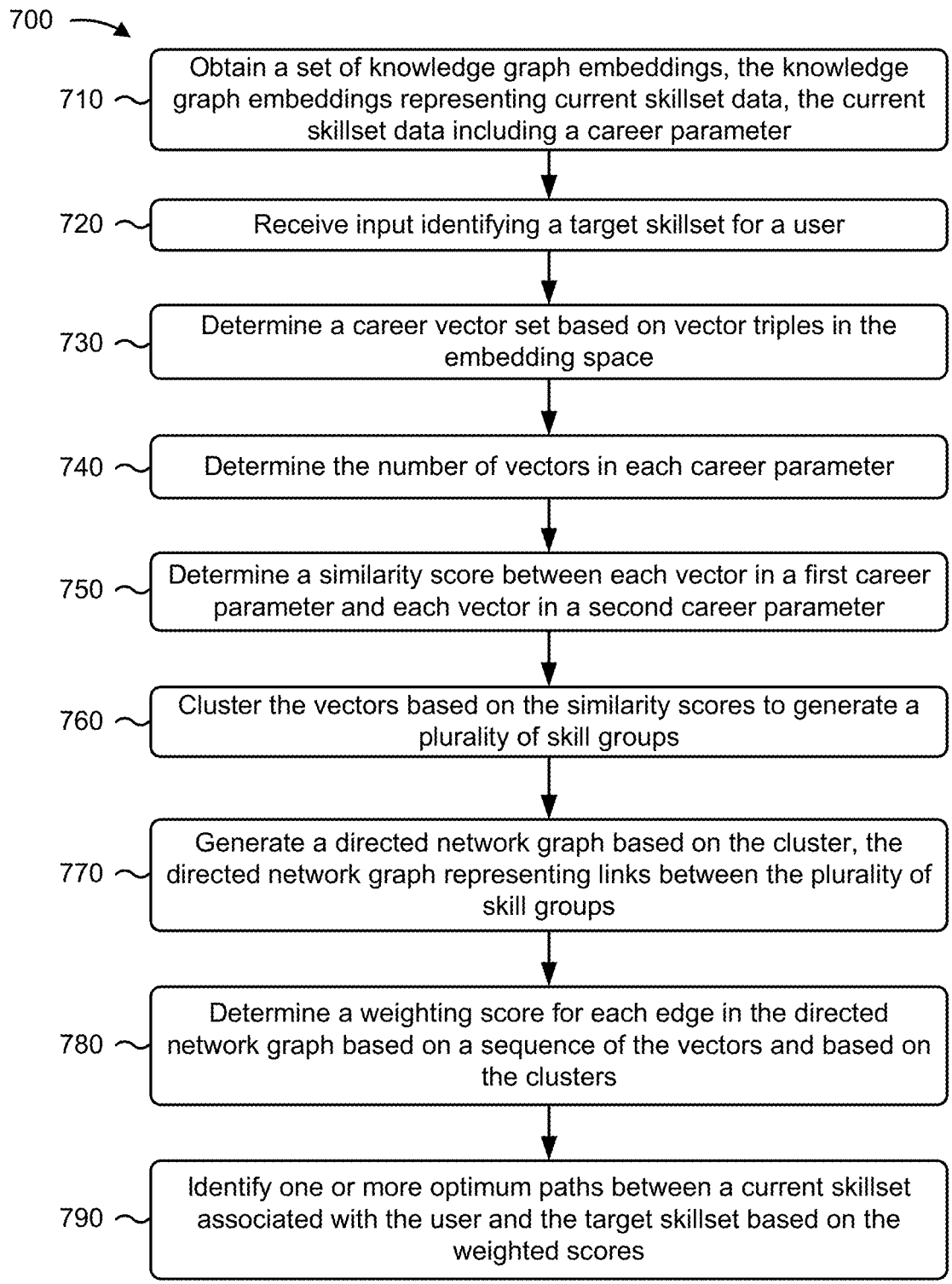

FIG. 7 is a flow chart of an example process 700 for identifying one or more paths for skill acquisition. In some implementations, one or more process blocks of FIG. 6 may be performed by a skill acquisition platform (e.g., skill acquisition platform 230). In some implementations, one or more process blocks of FIG. 7 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 7, process 700 may include obtaining a set of knowledge graph embeddings, the knowledge graph embeddings representing current skillset data, the current skillset data including a career parameter (block 710). For example, the skill acquisition platform (e.g., using processor 320, memory 330, storage component 340, input component 350, output component 360, communication interface 370 and/or the like) may obtain a set of knowledge graph embeddings, the knowledge graph embeddings representing current skillset data, the current skillset data including a career parameter, as described above.

As further shown in FIG. 7, process 700 may include receiving input identifying a target skillset for a user (block 720). For example, the skill acquisition platform (e.g., using processor 320, memory 330, storage component 340, input component 350, output component 360, communication interface 370 and/or the like) may receive input identifying a target skillset for a user, as described above.

As further shown in FIG. 7, process 700 may include determining a career vector set based on vector triples in the embedding space (block 730). For example, the skill acquisition platform (e.g., using processor 320, memory 330, storage component 340, input component 350, output component 360, communication interface 370 and/or the like) may determine a career vector set based on vector triples in the embedding space, as described above.

As further shown in FIG. 7, process 700 may include determining the number of vectors in each career parameter (block 740). For example, the skill acquisition platform (e.g., using processor 320, memory 330, storage component 340, input component 350, output component 360, communication interface 370 and/or the like) may determine the number of vectors in each career parameter, as described above.

As further shown in FIG. 7, process 700 may include determining a similarity score between each vector in a first career parameter and each vector in a second career parameter (block 750). For example, the skill acquisition platform (e.g., using processor 320, memory 330, storage component 340, input component 350, output component 360, communication interface 370 and/or the like) may determine a similarity score between each vector in a first career parameter and each vector in a second career parameter, as described above.

As further shown in FIG. 7, process 700 may include clustering the vectors based on the similarity scores to generate a plurality of skill groups (block 760). For example, the skill acquisition platform (e.g., using processor 320, memory 330, storage component 340, input component 350, output component 360, communication interface 370 and/or the like) may cluster the vectors based on the similarity scores to generate a plurality of skill groups, as described above.

As further shown in FIG. 7, process 700 may include generating a directed network graph based on the cluster, the directed network graph representing links between the plurality of skill groups (block 770). For example, the skill acquisition platform (e.g., using processor 320, memory 330, storage component 340, input component 350, output component 360, communication interface 370 and/or the like) may generate a directed network graph based on the cluster, the directed network graph representing links between the plurality of skill groups, as described above.

As further shown in FIG. 7, process 700 may include determining a weighting score for each edge in the directed network graph based on a sequence of the vectors and based on the clusters (block 780). For example, the skill acquisition platform (e.g., using processor 320, memory 330, storage component 340, input component 350, output component 360, communication interface 370 and/or the like) may determine a weighting score for each edge in the directed network graph based on a sequence of the vectors and based on the clusters, as described above.

As further shown in FIG. 7, process 700 may include identifying one or more optimum paths between a current skillset associated with the user and the target skillset based on the weighted scores (block 790). For example, the skill acquisition platform (e.g., using processor 320, memory 330, storage component 340, input component 350, output component 360, communication interface 370 and/or the like) may identify one or more optimum paths between a current skillset associated with the user and the target skillset based on the weighted scores, as described above.

Process 700 may include additional implementations, such as any single implementation or any combination of implementations described below and/or in connection with one or more other processes described elsewhere herein.

In a first implementation, process 700 includes generating the knowledge graph on a data set that includes resume data from a plurality of users; generating, based on the knowledge graph, a plurality of vectors for the plurality of users; and generating a respective career representation for each of the plurality of users, wherein each career representation is including one or more vectors of the plurality of vectors. In a second implementation, alone or in combination with the first implementation, generating the plurality of vectors comprises generating the plurality of vectors using a machine learning model on the knowledge graph.

In a third implementation, alone or in combination with one or more of the first and second implementations, obtaining the set of knowledge graph embeddings comprises receiving current skillset data; creating a knowledge graph based on the current skillset data, and converting the knowledge graph to the embedding space. In a fourth implementation, alone or in combination with one or more of the first through third implementations, process 700 includes receiving user request data, and determining a subset of the career parameters based on the user request data.

In a fifth implementation, alone or in combination with one or more of the first through fourth implementations, process 700 includes automatically is generating a descriptive analysis of the one or more optimum paths, wherein the descriptive analysis of the one or more is pathing identifies at least one of a graphical representation of the one or more is pathing, an is estimating path length for each of the one or more paths, one or more is linking of statistical interest included in the one or more paths, an is estimating difficulty of each of the one or more paths, or a frequency of occurrence of each of the one or more is pathing. In a sixth implementation, alone or in combination with one or more of the first through fifth implementations, generating the one or more optimal paths comprises: generating the one or more optimal paths using at least one of Dijkstra's algorithm, or a breadth-first search.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
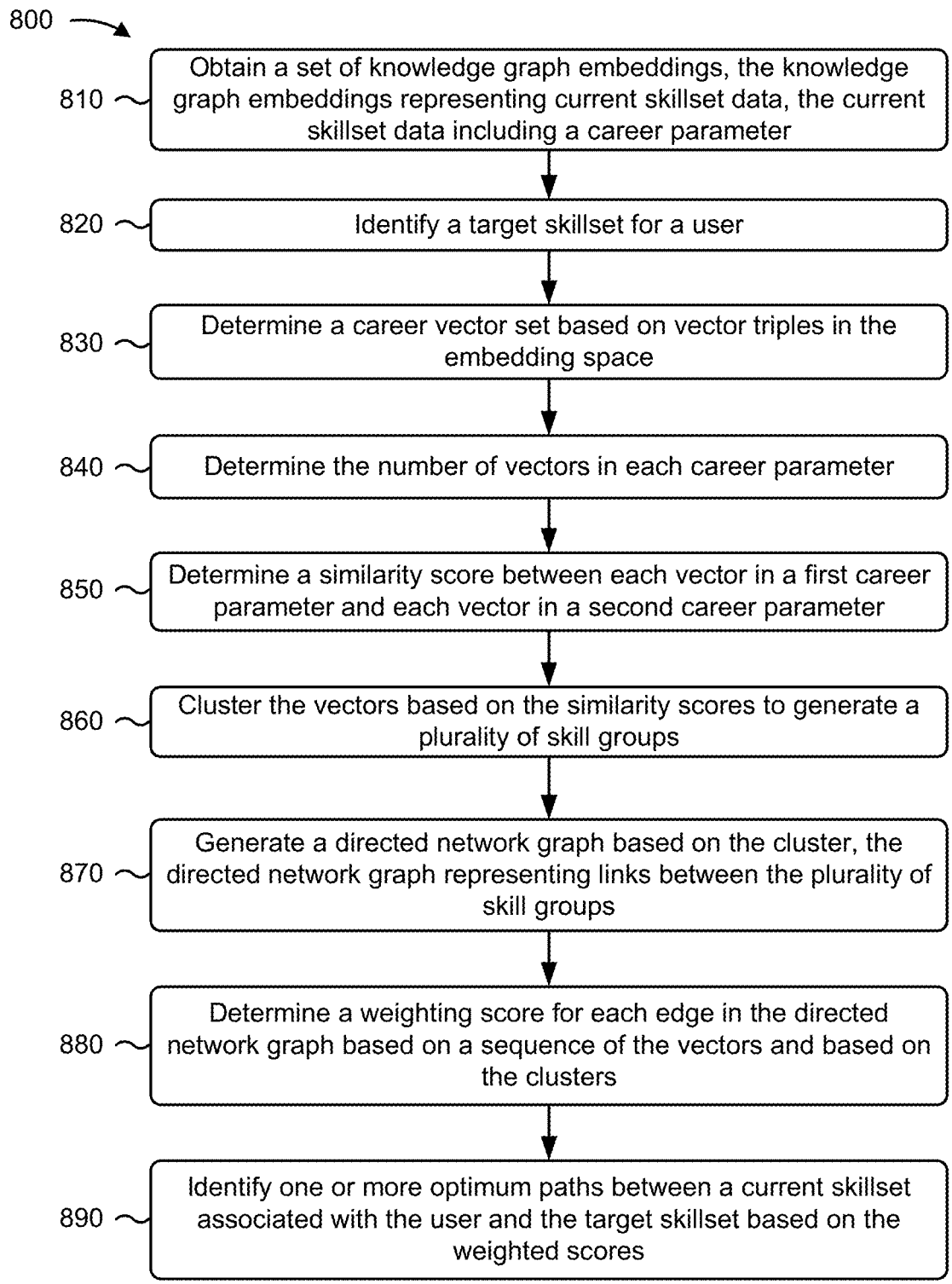

FIG. 8 is a flow chart of an example process 800 for identifying one or more paths for skill acquisition. In some implementations, one or more process blocks of FIG. 9 may be performed by a skill acquisition platform (e.g., skill acquisition platform 230). In some implementations, one or more process blocks of FIG. 9 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 8, process 800 may include obtaining a set of knowledge graph embeddings, the knowledge graph embeddings representing current skillset data, the current skillset data including a career parameter (block 810). For example, the skill acquisition platform (e.g., using processor 320, memory 330, storage component 340, input component 350, output component 360, communication interface 370 and/or the like) may obtain a set of knowledge graph embeddings, the knowledge graph embeddings representing current skillset data, the current skillset data including a career parameter, as described above.

As further shown in FIG. 8, process 800 may include identifying a target skillset for a user (block 820). For example, the skill acquisition platform (e.g., using processor 320, memory 330, storage component 340, input component 350, output component 360, communication interface 370 and/or the like) may identify a target skillset for a user, as described above.

As further shown in FIG. 8, process 800 may include determining a career vector set based on vector triples in the embedding space (block 830). For example, the skill acquisition platform (e.g., using processor 320, memory 330, storage component 340, input component 350, output component 360, communication interface 370 and/or the like) may determine a career vector set based on vector triples in the embedding space, as described above.

As further shown in FIG. 8, process 800 may include determining the number of vectors in each career parameter (block 840). For example, the skill acquisition platform (e.g., using processor 320, memory 330, storage component 340, input component 350, output component 360, communication interface 370 and/or the like) may determine the number of vectors in each career parameter, as described above.

As further shown in FIG. 8, process 800 may include determining a similarity score between each vector in a first career parameter and each vector in a second career parameter (block 850). For example, the skill acquisition platform (e.g., using processor 320, memory 330, storage component 340, input component 350, output component 360, communication interface 370 and/or the like) may determine a similarity score between each vector in a first career parameter and each vector in a second career parameter, as described above.

As further shown in FIG. 8, process 800 may include clustering the vectors based on the similarity scores to generate a plurality of skill groups (block 860). For example, the skill acquisition platform (e.g., using processor 320, memory 330, storage component 340, input component 350, output component 360, communication interface 370 and/or the like) may cluster the vectors based on the similarity scores to generate a plurality of skill groups, as described above.

As further shown in FIG. 8, process 800 may include generating a directed network graph based on the cluster, the directed network graph representing links between the plurality of skill groups (block 870). For example, the skill acquisition platform (e.g., using processor 320, memory 330, storage component 340, input component 350, output component 360, communication interface 370 and/or the like) may generate a directed network graph based on the cluster, the directed network graph representing links between the plurality of skill groups, as described above.

As further shown in FIG. 8, process 800 may include determining a weighting score for each edge in the directed network graph based on a sequence of the vectors and based on the clusters (block 880). For example, the skill acquisition platform (e.g., using processor 320, memory 330, storage component 340, input component 350, output component 360, communication interface 370 and/or the like) may determine a weighting score for each edge in the directed network graph based on a sequence of the vectors and based on the clusters, as described above.

As further shown in FIG. 8, process 800 may include identifying one or more optimum paths between a current skillset associated with the user and a target skillset based on the weighted scores (block 890). For example, the skill acquisition platform (e.g., using processor 320, memory 330, storage component 340, input component 350, output component 360, communication interface 370 and/or the like) may identify one or more optimum paths between a current skillset associated with the user and a target skillset based on the weighted scores, as described above.

Process 800 may include additional implementations, such as any single implementation or any combination of implementations described below and/or in connection with one or more other processes described elsewhere herein.

In a first implementation, process 800 includes determining a first set of vector distances between each of the vectors in the first career parameter and each of vectors in the first career parameter; determining a second set of vector distances between each of the vectors in the first career parameter and each of vectors in the first career parameter; determining a third set of vector distances between each of the vectors in the first career parameter and each of vectors in the first career parameter; ranking vector distances in the first set of vector distances, the second set of vector distances, and the third set of vector distances from least to greatest or greatest to least; and performing a summation of the ranked vector distances from least to greatest or greatest to least; and dividing the summation by a quantity of the ranked vector distances to generate the similarity metrics.

In a second implementation, alone or in combination with the first implementation, process 800 includes receiving current skillset data; creating a knowledge graph based on the current skillset data, and converting the knowledge graph to the embedding space. In a third implementation, alone or in combination with one or more of the first and second implementations, process 800 includes generating a descriptive analysis of the one or more optimal paths that identifies at least one of: a graphical representation of the one or more optimal paths, an is estimating path length for each of the one or more optimal paths, one or more is linking of statistical interest included in the one or more optimal paths, an is estimating difficulty of each of the one or more optimal paths, or a frequency of occurrence of each of the one or more optimal paths.

In a fourth implementation, alone or in combination with one or more of the first through third implementations, the one or more processors are further configured to at least one of: automatically enroll the user in a class to obtain a skill included in one or more optimal paths, automatically identify one or more job postings associated with a role included in the one or more optimal paths, automatically transmit, to a user device associated with the user, an instruction to display the class or the one or more job postings, or automatically transmit, to the user device, an instruction to display a visual representation of the one or more optimal paths.

In a fifth implementation, alone or in combination with one or more of the first through fourth implementations, vectors of the first career parameter and the second career parameter comprise at least one of: a user vector, a skill vector, an experience vector, an industry vector, an education vector, or a certification vector. In a sixth implementation, alone or in combination with one or more of the first through fifth implementations, process 800 includes identifying the one or more paths using at least one of: Dijkstra's algorithm, or a breadth-first is searching.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
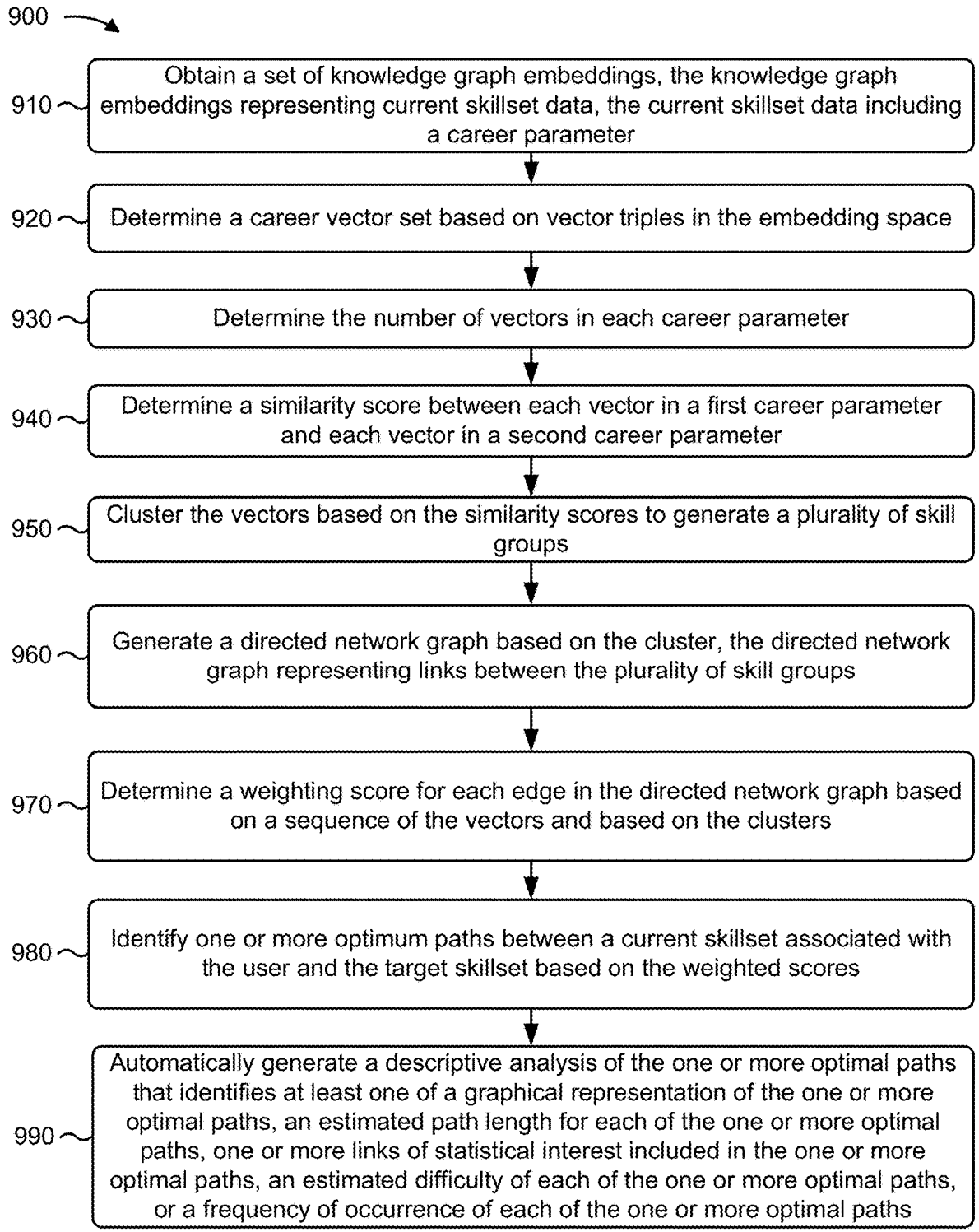

FIG. 9 is a flow chart of an example process 900 for identifying one or more paths for skill acquisition. In some implementations, one or more process blocks of FIG. 9 may be performed by a skill acquisition platform (e.g., skill acquisition platform 230). In some implementations, one or more process blocks of FIG. 9 may be performed by another device or a group of devices separate from or including the skill acquisition platform, such as a user device (e.g., user device 210), a data store device (e.g., data store device 220), a computing resource (e.g., computing resource 234), and/or the like.

As shown in FIG. 9, process 900 may include obtaining a set of knowledge graph embeddings, the knowledge graph embeddings representing current skillset data, the current skillset data including a career parameter (block 910). For example, the skill acquisition platform (e.g., using processor 320, memory 330, storage component 340, input component 350, output component 360, communication interface 370 and/or the like) may obtain a set of knowledge graph embeddings, the knowledge graph embeddings representing current skillset data, the current skillset data including a career parameter, as described above.

As further shown in FIG. 9, process 900 may include determining a career vector set based on vector triples in the embedding space (block 920). For example, the skill acquisition platform (e.g., using processor 320, memory 330, storage component 340, input component 350, output component 360, communication interface 370 and/or the like) may determine a career vector set based on vector triples in the embedding space, as described above.

As further shown in FIG. 9, process 900 may include determining the number of vectors in each career parameter (block 930). For example, the skill acquisition platform (e.g., using processor 320, memory 330, storage component 340, input component 350, output component 360, communication interface 370 and/or the like) may determine the number of vectors in each career parameter, as described above.

As further shown in FIG. 9, process 900 may include determining a similarity score between each vector in a first career parameter and each vector in a second career parameter (block 940). For example, the skill acquisition platform (e.g., using processor 320, memory 330, storage component 340, input component 350, output component 360, communication interface 370 and/or the like) may determine a similarity score between each vector in a first career parameter and each vector in a second career parameter, as described above.

As further shown in FIG. 9, process 900 may include clustering the vectors based on the similarity scores to generate a plurality of skill groups (block 950). For example, the skill acquisition platform (e.g., using processor 320, memory 330, storage component 340, input component 350, output component 360, communication interface 370 and/or the like) may cluster the vectors based on the similarity scores to generate a plurality of skill groups, as described above.

As further shown in FIG. 9, process 900 may include generating a directed network graph based on the cluster, the directed network graph representing links between the plurality of skill groups (block 960). For example, the skill acquisition platform (e.g., using processor 320, memory 330, storage component 340, input component 350, output component 360, communication interface 370 and/or the like) may generate a directed network graph based on the cluster, the directed network graph representing links between the plurality of skill groups, as described above.

As further shown in FIG. 9, process 900 may include determining a weighting score for each edge in the directed network graph based on a sequence of the vectors and based on the clusters (block 970). For example, the skill acquisition platform (e.g., using processor 320, memory 330, storage component 340, input component 350, output component 360, communication interface 370 and/or the like) may determine a weighting score for each edge in the directed network graph based on a sequence of the vectors and based on the clusters, as described above.

As further shown in FIG. 9, process 900 may include identifying one or more optimum paths between a current skillset associated with the user and a target skillset based on the weighted scores (block 980). For example, the skill acquisition platform (e.g., using processor 320, memory 330, storage component 340, input component 350, output component 360, communication interface 370 and/or the like) may identify one or more optimum paths between a current skillset associated with the user and a target skillset based on the weighted scores, as described above.

As further shown in FIG. 9, process 900 may include automatically generate a descriptive analysis of the one or more optimal paths that identifies at least one of a graphical representation of the one or more optimal paths, an estimated path length for each of the one or more optimal paths, one or more links of statistical interest included in the one or more optimal paths, an estimated difficulty of each of the one or more optimal paths, or a frequency of occurrence of each of the one or more optimal paths (block 990). For example, the skill acquisition platform (e.g., using processor 320, memory 330, storage component 340, input component 350, output component 360, communication interface 370 and/or the like) may automatically generate a descriptive analysis of the one or more optimal paths that identifies at least one of a graphical representation of the one or more optimal paths, an estimated path length for each of the one or more optimal paths, one or more links of statistical interest included in the one or more optimal paths, an estimated difficulty of each of the one or more optimal paths, or a frequency of occurrence of each of the one or more optimal paths, as described above.

Process 900 may include additional implementations, such as any single implementation or any combination of implementations described below and/or in connection with one or more other processes described elsewhere herein.

In a first implementation, process 900 includes determining vector distances between each of the vectors in the first career parameter and each vector in the second career parameter; ranking the vector distances from least to greatest or greatest to least; determining weighted averages based on the ranked vector distances, wherein the weighted averages is representing skill distances between the first career parameter and the second career parameter; performing a summation of the weighted averages from least to greatest or greatest to least; and dividing the summation by a quantity of the weighted averages to generate the similarity score.

In a second implementation, alone or in combination with the first implementation, process 900 includes receiving current skillset data; creating a knowledge graph based on the current skillset data and converting the knowledge graph to the embedding space. In a third implementation, alone or in combination with one or more of the first and second implementations, process 900 includes receiving user request data, and determining a subset of the career parameters based on the user request data.

In a fourth implementation, alone or in combination with one or more of the first through third implementations, vectors of the first career parameter and vectors of the second career parameter comprise at least one of: a user vector, a skill vector, an experience vector, an industry vector, an education vector, or a certification vector. In a fifth implementation, alone or in combination with one or more of the first through fourth implementations, process 900 includes generating the knowledge graph on a data set that includes resume data from a plurality of users; generating, based on the knowledge graph, a plurality of vectors for the plurality of users; and generating the respective career representation for each of the plurality of users, wherein each career representation is including one or more vectors of the plurality of vectors.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, input identifying a target skillset for a user;
generating, by the device, based on a knowledge graph, comprising current skillset data associated with a plurality of users different from the user, and using a machine learning model for relational learning on the knowledge graph, a plurality of embedded vectors, for the knowledge graph, associated with one or more career parameters associated with the plurality of users;
determining, by the device, a similarity score between each embedded vector, of the plurality of embedded vectors, and the target skillset;
clustering, by the device and based on determining the similarity score, the plurality of embedded vectors to generate a plurality of skill groups associated with the plurality of embedded vectors;
generating, by the device, a directed network graph representing one or more links between the plurality of skill groups, wherein the links between the plurality of skill groups represent moves between the plurality of skill groups taken by one or more users including the user;
identifying, by the device and in the directed network graph, one or more paths from a current skillset, associated with the user, and the target skillset, wherein each path, of the one or more or more paths, includes at least one link, of the one or more links, and represents a particular set of embedded vectors, of the plurality of embedded vectors, that the user adds to a career representation associated with the user in order to obtain or qualify for the target skillset;
determining, by the device, weighted scores for edges in the directed network graph based on a sequence of at least a subset of the plurality of embedded vectors and based on the plurality of skill groups; and
identifying, by the device, one or more optimum paths, of the one or more optimum paths, for the user between the current skillset and the target skillset based on the weighted scores.

2. The method of claim 1, further comprising:
generating the knowledge graph on a data set that includes resume data from the plurality of users; and
generating, based on the plurality of embedded vectors, a respective career representation for each of the plurality of users.

3. The method of claim 1, further comprising:
receiving the current skillset data; and
creating the knowledge graph based on the current skillset data.

4. The method of claim 1, further comprising:
determining the one or more career parameters based on the input identifying the target skillset.

5. The method of claim 1, further comprising:
automatically generating a descriptive analysis of the one or more optimum paths,
wherein the descriptive analysis of the one or more optimum paths identifies at least one of:
a graphical representation of the one or more optimum paths,
an estimated path length for each of the one or more optimum paths,
one or more links of statistical interest included in the one or more optimum paths,
an estimated difficulty of each of the one or more optimum paths, or
a frequency of occurrence of each of the one or more optimum paths.

6. The method of claim 1, further comprising:
generating the one or more optimum paths using at least one of:
Dijkstra's algorithm, or
a breadth-first search.

7. A skill acquisition platform, comprising:
one or more memories; and
one or more processors, coupled to the one or more memories, configured to:
identify a target skillset for a user;
generate, based on a knowledge graph, comprising current skillset data associated with a plurality of users different from the user, and using a machine learning model for relational learning on the knowledge graph, a plurality of embedded vectors, for the knowledge graph, associated with one or more career parameters associated with the plurality of users;
determine a similarity score between each embedded vector, of the plurality of embedded vectors, and the target skillset;
cluster, based on determining the similarity score, the plurality of embedded vectors to generate a plurality of skill groups associated with the plurality of embedded vectors;
generate a directed network graph representing one or more links between the plurality of skill groups, wherein the links between the plurality of skill groups represent moves between the plurality of skill groups taken by one or more users including the user;
identify, in the directed network graph, one or more paths from a current skillset, associated with the user, and the target skillset, wherein each path, of the one or more or more paths, includes at least one link, of the one or more links, and represents a particular set of embedded vectors, of the plurality of embedded vectors, that the user adds to a career representation associated with the user in order to obtain or qualify for the target skillset;
determine weighted scores for edges in the directed network graph based on a sequence of at least a subset of the plurality of embedded vectors and based on the plurality of skill groups; and
identify one or more optimum paths, of the one or more optimum paths, for the user between the current skillset and the target skillset based on the weighted scores.

8. The skill acquisition platform of claim 7, wherein the one or more processors, to determine the similarity score, are configured to:
determine embedded vector distances between each set of the plurality of embedded vectors;
perform a summation of the embedded vector distances; and
divide the summation by a quantity of the embedded vector distances to determine the similarity score.

9. The skill acquisition platform of claim 7, wherein the one or more processors are further configured to:
receive the current skillset data; and
create the knowledge graph based on the current skillset data.

10. The skill acquisition platform of claim 7, wherein the one or more processors are further configured to:
generate a descriptive analysis of the one or more optimum paths that identifies at least one of:
a graphical representation of the one or more optimum paths,
an estimated path length for each of the one or more optimum paths,
one or more links of statistical interest included in the one or more optimum paths,
an estimated difficulty of each of the one or more optimum paths, or
a frequency of occurrence of each of the one or more optimum paths.

11. The skill acquisition platform of claim 7, wherein the one or more processors are further configured to at least one of:
automatically enroll the user in a class to obtain a skill included in the one or more optimum paths,
automatically identify one or more job postings associated with a role included in the one or more optimum paths,
automatically transmit, to a user device associated with the user, an instruction to display the class or the one or more job postings, or
automatically transmit, to the user device, an instruction to display a visual representation of the one or more optimum paths.

12. The skill acquisition platform of claim 7, wherein at least one of the plurality of embeddings relates to:
a user embedded vector,
a skill embedded vector,
an experience embedded vector,
an industry embedded vector,
an education embedded vector, or
a certification embedded vector.

13. The skill acquisition platform of claim 7, wherein the one or more processors are further configured to:
generate the one or more optimum paths using at least one of:
Dijkstra's algorithm, or
a breadth-first search.

14. A non-transitory computer-readable medium storing instructions, the instructions comprising:
one or more instructions that, when executed by one or more processors, cause the one or more processors to:

generate, based on a knowledge graph, comprising current skillset data associated with a plurality of users, and using a machine learning model for relational learning on the knowledge graph, a plurality of embedded vectors, for the knowledge graph, associated with one or more career parameters associated with the plurality of users;

determine a similarity score between each embedded vector, of the plurality of embedded vectors, and a target skillset for a user different from the plurality of users;

cluster, based on determining the similarity score, the plurality of embedded vectors to generate a plurality of skill groups associated with the plurality of embedded vectors;

generate a directed network graph representing one or more links between the plurality of skill groups, wherein the links between the plurality of skill groups represent moves between the plurality of skill groups taken by one or more users including the user;

identify, in the directed network graph, one or more paths from a current skillset, associated with the user, and the target skillset, wherein each path, of the one or more paths, includes at least one link, of the one or more links, and represents a particular set of embedded vectors, of the plurality of embedded vectors, that the user adds to a career representation associated with the user in order to obtain or qualify for the target skillset;

determine weighted scores for edges in the directed network graph based on a sequence of at least a subset of the plurality of embedded vectors and based on the plurality of skill groups;

identify one or more optimum paths, of the one or more optimum paths, for the user between the current skillset and the target skillset based on the weighted scores; and automatically generate a descriptive analysis of the one or more optimal paths that identifies at least one of:
- a graphical representation of the one or more optimal paths,
- an estimated path length for each of the one or more optimal paths,
- one or more links of statistical interest included in the one or more optimal paths,
- an estimated difficulty of each of the one or more optimal paths, or
- a frequency of occurrence of each of the one or more optimal paths.

15. The non-transitory computer-readable medium of claim 14, wherein the one or more instructions, that cause the one or more processors to determine the similarity score, cause the one or more processors to:
   determine embedded vector distances between each set of the plurality of embedded vectors;
   perform a summation of the embedded vector distances; and
   divide the summation by a quantity of the plurality of embedded vectors to determine the similarity score.

16. The non-transitory computer-readable medium of claim 14, wherein the one or more instructions, when executed by the one or more processors, further cause the one or more processors to:
   receive the current skillset data; and
   create the knowledge graph based on the current skillset data.

17. The non-transitory computer-readable medium of claim 14, wherein the one or more instructions, when executed by the one or more processors, further cause the one or more processors to:
   determine the one or more career parameters based on the target skillset.

18. The non-transitory computer-readable medium of claim 14, wherein at least one of the plurality of embedded vectors relates to:
   a user embedded vector,
   a skill embedded vector,
   an experience embedded vector,
   an industry embedded vector,
   an education embedded vector, or
   a certification embedded vector.

19. The non-transitory computer-readable medium of claim 14, wherein the one or more instructions, when executed by the one or more processors, further cause the one or more processors to:
   generate a career representation for each of the plurality of users based on one or more corresponding embeddings of the plurality of embedding vectors.

* * * * *